US010119841B2

(12) United States Patent
Tsukamoto et al.

(10) Patent No.: US 10,119,841 B2
(45) Date of Patent: Nov. 6, 2018

(54) MAGNETIC POSITION DETECTION DEVICE AND MAGNETIC POSITION DETECTION METHOD

(71) Applicant: Mitsubishi Electric Corporation, Tokyo (JP)

(72) Inventors: Shohei Tsukamoto, Tokyo (JP); Takafumi Hara, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 18 days.

(21) Appl. No.: 15/507,982

(22) PCT Filed: Oct. 24, 2014

(86) PCT No.: PCT/JP2014/078376
§ 371 (c)(1),
(2) Date: Mar. 1, 2017

(87) PCT Pub. No.: WO2016/063417
PCT Pub. Date: Apr. 28, 2016

(65) Prior Publication Data
US 2017/0307416 A1 Oct. 26, 2017

(51) Int. Cl.
*G01B 7/14* (2006.01)
*G01B 7/30* (2006.01)
(Continued)

(52) U.S. Cl.
CPC ........... *G01D 5/2497* (2013.01); *G01D 5/245* (2013.01)

(58) Field of Classification Search
CPC ... G01B 7/00; G01B 7/04; G01B 7/14; G01B 7/30; G01R 33/02; G01R 33/07;
(Continued)

(56) References Cited

U.S. PATENT DOCUMENTS 5,574,364 A * 11/1996 Kajimoto .............. F02D 41/009
324/207.12
6,018,881 A * 2/2000 Spies ..................... G01D 5/145
33/706
(Continued)

FOREIGN PATENT DOCUMENTS

| JP | 63-193002 A | 8/1988 |
| JP | 05-026684 A | 2/1993 |
| WO | 2014/174586 A1 | 10/2014 |

OTHER PUBLICATIONS

International Search Report for PCT/JP2014/078376 dated Jan. 27, 2015 [PCT/ISA?210].
(Continued)

*Primary Examiner* — Neel Shah
(74) *Attorney, Agent, or Firm* — Sughrue Mion, PLLC; Richard C. Turner

(57) ABSTRACT

A magnetic position detection device includes two magnetic scales 1a, 1b on which N and S magnetic poles are disposed alternately, magnetism sensing element groups 2a, 2b for measuring variation in magnetic fields formed respectively by the magnetic scales 1a, 1b, and a position calculation device 3 for calculating absolute positions of magnetism sensing elements 21 on the magnetic scales 1a, 1b from output values output by the magnetism sensing elements 21, wherein a difference between the respective numbers of magnetic poles on the magnetic scales 1a, 1b is 2, and the magnetism sensing elements 21 are disposed such that arrangement intervals between the magnetism sensing elements 21 of the respective magnetism sensing element groups 2a, 2b each take a value obtained by dividing a length of one magnetic pole equally by the number of magnetism sensing elements 21.

10 Claims, 10 Drawing Sheets

(51) Int. Cl.
*G01R 33/02* (2006.01)
*G01R 33/07* (2006.01)
*G01R 33/09* (2006.01)
*G01D 5/14* (2006.01)
*H03M 1/22* (2006.01)
*G01D 5/249* (2006.01)
*G01D 5/245* (2006.01)

(58) Field of Classification Search
CPC .......... G01R 33/09; G01D 5/14; G01D 5/145; H03M 1/22
See application file for complete search history.

(56) References Cited

U.S. PATENT DOCUMENTS

| | | | |
|---|---|---|---|
| 6,992,478 B2* | 1/2006 | Etherington | G01D 5/145 |
| | | | 324/207.2 |
| 7,705,587 B2* | 4/2010 | Legrand | G01D 5/2457 |
| | | | 324/207.25 |
| 2007/0103343 A1* | 5/2007 | Recio | G01D 5/145 |
| | | | 341/15 |
| 2013/0090890 A1 | 4/2013 | Meyer | |
| 2016/0041010 A1* | 2/2016 | Hara | G01D 5/2451 |
| | | | 324/207.13 |

OTHER PUBLICATIONS

Written Opinion for PCT/JP2014/078376 dated Jan. 27, 2015 [PCT/ISA/210].

* cited by examiner

FIG. 3
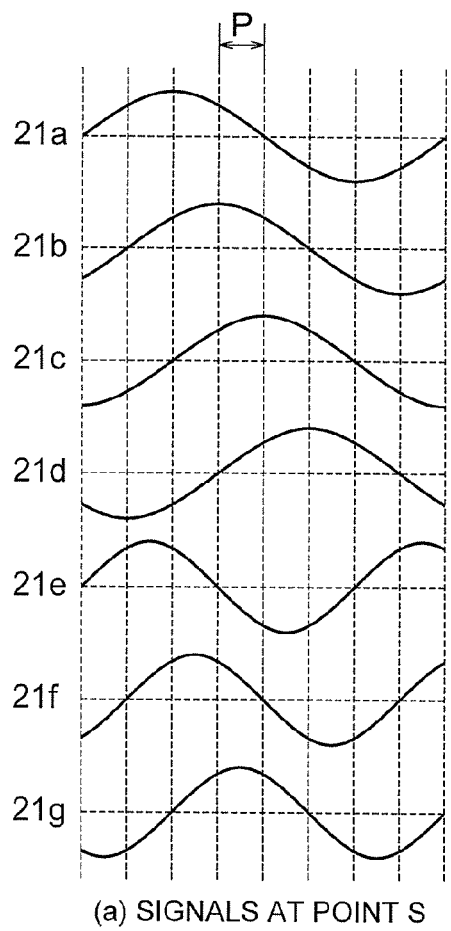
(a) SIGNALS AT POINT S
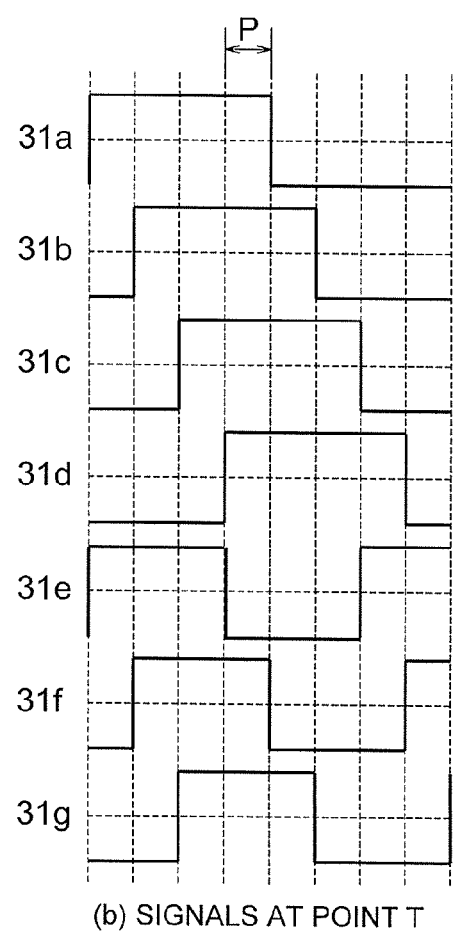
(b) SIGNALS AT POINT T (a) OUTPUT SIGNALS OF PULSE GENERATION UNIT 31

(b) DETERMINATION VALUES FROM Hi/Lo DETERMINATION UNIT 32
AND DATA ON POSITION CONVERSION TABLE 34

FIG. 9

| SIGNALS | MAGNETIC SCALE POSITION | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| SIGNALS FROM POSITION COUNTER UNIT 36 | 0 | | | | | | 1 | | | | | | 2 | | | | | | 3 | | | | | |
| POSITIONS OF 32e TO 32g | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 |
| 32e | Hi | Hi | Hi | Lo | Lo | Lo | Hi | Hi | Hi | Lo | Lo | Lo | Hi | Hi | Hi | Lo | Lo | Lo | Hi | Hi | Hi | Lo | Lo | Lo |
| 32f | Hi | Hi | Lo | Lo | Lo | Hi | Hi | Hi | Lo | Lo | Lo | Hi | Hi | Hi | Lo | Lo | Lo | Hi | Hi | Hi | Lo | Lo | Lo | Hi |
| 32g | Hi | Lo | Lo | Lo | Hi | Hi | Hi | Lo | Lo | Lo | Hi | Hi | Hi | Lo | Lo | Lo | Hi | Hi | Hi | Lo | Lo | Lo | Hi | Hi |

MAGNETIC POSITION DETECTION DEVICE AND MAGNETIC POSITION DETECTION METHOD

CROSS REFERENCE TO RELATED APPLICATIONS

This application is a National Stage of International Application No. PCT/JP2014/078376 filed Oct. 24, 2014, the contents of all of which are incorporated herein by reference in their entirety.

TECHNICAL FIELD

This invention relates to a magnetic position detection device and a magnetic position detection method employing a magnetic scale and a magnetism sensing element, and more particularly to a magnetic position detection device and a magnetic position detection method with which a highly precise response can be obtained at high speed by means of a simple configuration.

BACKGROUND ART

A conventional magnetic position detection device (see International Application Number PCT/JP2013/061871, for example) is provided with a magnetic scale formed from a plurality of magnetic pole pairs, each pair having a width $2\lambda$ and including a first magnetic portion and a second magnetic portion that exhibit different magnetic properties and each have a width $\lambda$. The pairs of magnetic poles are arranged in a row at equal intervals in periods of the magnetic pole pair width $2\lambda$.

Further, a magnetism sensing device is disposed opposite the magnetic scale via a predetermined air gap. The magnetism sensing device is moved relative to the magnetic scale through a magnetic field formed by the magnetic scale in an arrangement direction of the magnetic scale while maintaining the air gap, and variation in the magnetic field during this relative movement is measured using magnetism sensing elements.

As the magnetism sensing elements, the magnetism sensing device includes a group of first magnetism sensing elements constituted by n (where n is a natural number no smaller than 2) first magnetism sensing elements that are arranged at equal intervals of a magnetism sensing element interval P such that $\lambda=nP$. The respective first magnetism sensing elements output measurement results indicating variation in the magnetic field during the relative movement in parallel.

A position calculation circuit calculates a relative position of the magnetism sensing device on the magnetic scale by analyzing output values output by the magnetism sensing device. The position calculation circuit calculates the relative position of the magnetism sensing device on the magnetic scale at a position detection resolution of $\lambda/n$ by analyzing the output values output in parallel by the n first magnetism sensing elements.

SUMMARY OF INVENTION

Technical Problem

In the conventional magnetic position detection device described above, information indicating detected positions of the magnetic pole pairs is stored in a memory so that the stored position information can be used to detect an absolute position. In a case where the memory is a volatile memory, however, the position information stored in the memory is deleted when a power supply of the magnetic position detection device is switched OFF. As a result, an absolute position cannot be detected when the power supply of the magnetic position detection device is switched ON.

Further, even in a case where the memory is a nonvolatile memory, if the positions of the magnetism sensing elements on the magnetic scale are moved after the power supply of the magnetic position detection device is switched OFF, the information indicating the positions of the magnetic pole pairs, which is stored in the memory, deviates from the actual positions thereof, and therefore absolute positions cannot be detected accurately when the power supply of the magnetic position detection device is switched ON.

This invention has been designed to solve the problems described above, and an object thereof is to obtain a magnetic position detection device and a magnetic position detection method with which an absolute position can be detected precisely and at high speed by means of a simple configuration.

Solution to Problem

This invention is a magnetic position detection device including: a magnetic scale constituted by a first magnetic scale on which N magnetic poles and S magnetic poles of a uniform length $\lambda1$ are arranged alternately in a movement direction, and a second magnetic scale which is provided parallel to the first magnetic scale, and on which N magnetic poles and S magnetic poles of a uniform length $\lambda2$ are arranged alternately in the movement direction; a magnetism sensing device that is disposed opposite the first magnetic scale and the second magnetic scale via respective air gaps, and that moves in the movement direction relative to the first magnetic scale and the second magnetic scale through magnetic fields formed respectively by the first magnetic scale and the second magnetic scale while maintaining the air gaps, and measures using magnetism sensing elements variation in the magnetic fields during the relative movement; and a position calculation device in which signal patterns of the magnetism sensing elements and information indicating absolute positions of the magnetism sensing elements on the magnetic scale are stored in association with each other in advance, and which calculates the absolute positions of the magnetism sensing elements on the magnetic scale from output values of the magnetism sensing elements, output by the magnetism sensing device, wherein: a total number of magnetic poles obtained by adding together respective numbers of the N magnetic poles and the S magnetic poles included on the first magnetic scale is k, and a total number of magnetic poles obtained by adding together respective numbers of the N magnetic poles and the S magnetic poles included on the second magnetic scale is k+2, a difference between the respective numbers of magnetic poles being 2; the magnetism sensing device includes a first magnetism sensing element group constituted by one or more magnetism sensing elements for detecting variation in the magnetic field formed by the first magnetic scale, and a second magnetism sensing element group constituted by one or more magnetism sensing elements for detecting variation in the magnetic field formed by the second magnetic scale, measurement results indicating variation in the magnetic fields during the relative movement being output in parallel by the respective magnetism sensing elements constituting the first magnetism sensing element group and the second magnetism sensing element group; a ratio of a number n of magnetism sensing elements in the first magnetism sensing element group to a number m of magnetism sensing elements in the second magnetism sensing element group is equal to a ratio of an inverse of the number k of magnetic poles on the first magnetic scale to an inverse of the number k+2 of magnetic poles on the second magnetic scale; and the magnetism sensing elements are arranged by setting an arrangement interval between the magnetism sensing elements of the first magnetism sensing element group at P1 so that output waveforms of signals output respectively by the magnetism sensing elements of the first magnetism sensing element group deviate from each other successively by a phase $P1=\lambda1/n$ obtained by dividing the length $\lambda1$ of one magnetic pole of the first magnetic scale equally by the number n of magnetism sensing elements, and setting an arrangement interval between the magnetism sensing elements of the second magnetism sensing element group at P2 so that output waveforms of signals output respectively by the magnetism sensing elements of the second magnetism sensing element group deviate from each other successively by a phase $P2=\lambda2/m$ obtained by dividing the length $\lambda2$ of one magnetic pole of the second magnetic scale equally by the number m of magnetism sensing elements, or, in a case where one of the number n of magnetism sensing elements in the first magnetism sensing element group and the number m of magnetism sensing elements in the second magnetism sensing element group is an even number and the other is an odd number, the magnetism sensing elements are arranged by halving the even number of magnetism sensing elements.

Advantageous Effects of Invention

According to this invention, the two magnetic scales and the plurality of magnetism sensing elements are provided, and therefore a magnetic position detection device and a magnetic position detection method with which an absolute position can be detected precisely and at high speed by means of a simple configuration can be obtained.

BRIEF DESCRIPTION OF DRAWINGS

FIG. 3 is a view showing output waveforms output by a magnetism sensing device and a pulse generation unit when the magnetism sensing device moves relative to the magnetic scale, according to the first embodiment of this invention.

FIG. 9 is a view showing an example of respective outputs of a Hi/Lo determination unit and a position counter unit and positions on a magnetic scale obtained when a magnetism sensing device is moved relative to the magnetic scale, according to the fourth embodiment of this invention.

DESCRIPTION OF EMBODIMENTS

Preferred embodiments of a magnetic position detection device and a magnetic position detection method according to this invention will be described below using the drawings. Note that identical or corresponding parts of the drawings will be described using identical reference symbols.

First Embodiment

A magnetic position detection device according to a first embodiment of this invention includes two magnetic scales, one of which has two more magnetic poles than the other, a magnetism sensing device that detects magnetic fields formed by the respective magnetic scales using magnetism sensing elements, and a position calculation device that calculates absolute positions of the magnetism sensing elements on the magnetic scales from output values output by the magnetism sensing elements. With this magnetic position detection device, the absolute positions are detected precisely and at high speed by means of a simple configuration.

Figure 1:
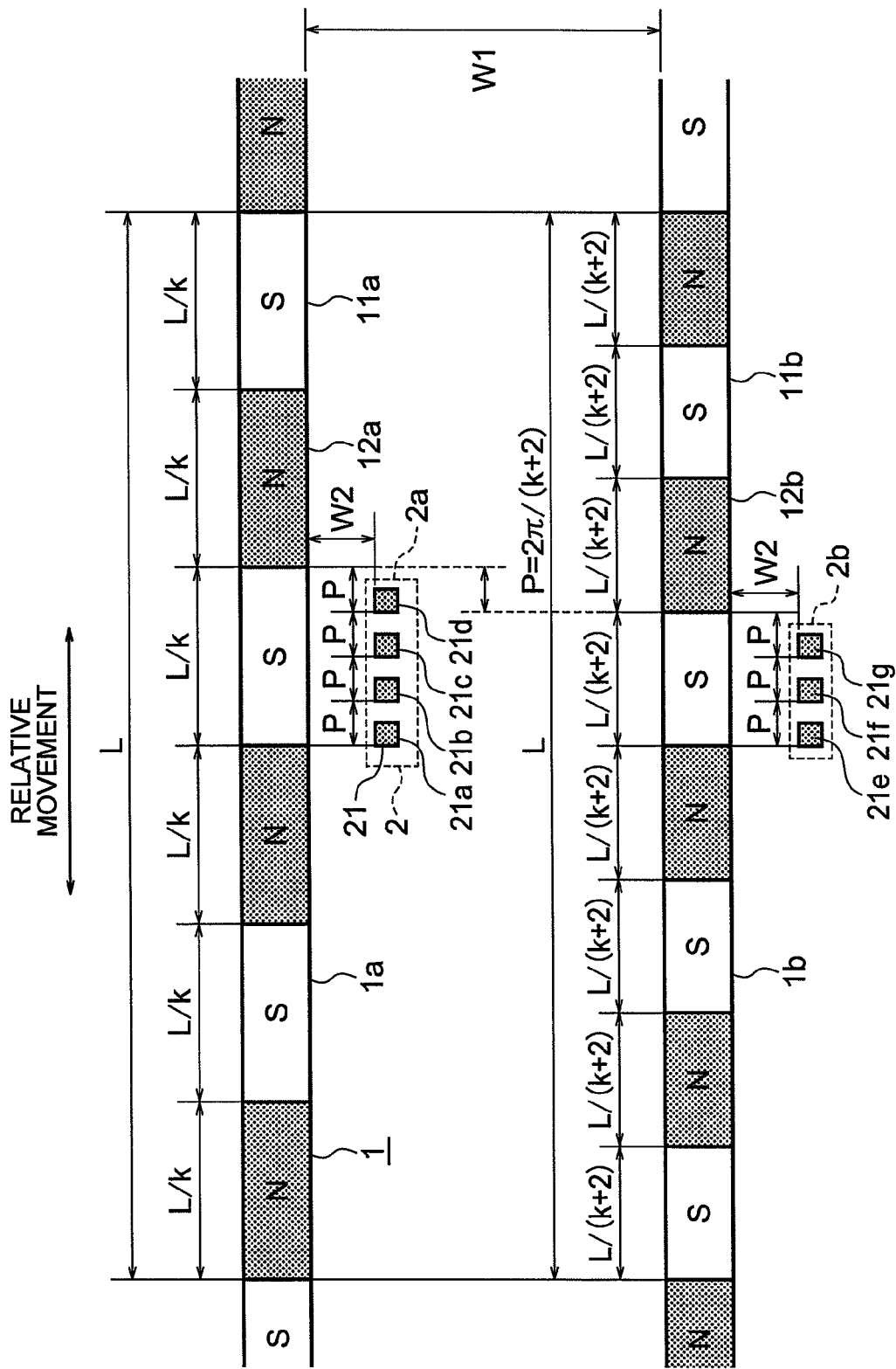
FIG. 1 is a view showing an arrangement of a magnetic scale and magnetism sensing elements according to a first embodiment of this invention.

FIG. 1 is a view showing an example configuration of the magnetic position detection device according to the first embodiment of this invention. The magnetic position detection device according to the first embodiment includes a magnetic scale 1, a magnetism sensing device 2, and a position calculation device 3 (not shown in the drawing; see FIG. 2).

The magnetic scale 1 is constituted by a first magnetic scale 1a and a second magnetic scale 1b. The first magnetic scale 1a and the second magnetic scale 1b are disposed parallel to each other via an air gap W1. The air gap W1 is set in advance at a desired width. Note that the width of the air gap W1 does not have to be constant, and may vary according to position.

Further, as shown in FIG. 1, the first magnetic scale 1a is constituted by N magnetic poles 12a and S magnetic poles 11a. The N magnetic poles 12a and the S magnetic poles 11a have a uniform length $\lambda1$ (=L/k). The N magnetic poles 12a and the S magnetic poles 11a are arranged alternately.

The second magnetic scale 1b is constituted by N magnetic poles 12b and S magnetic poles 11b. The N magnetic poles 12b and the S magnetic poles 11b have a uniform length $\lambda2$ (=L/(k+2)). The N magnetic poles 12b and the S magnetic poles 11b are arranged alternately.

Hereafter, an adjacent pair of magnetic poles formed from one N magnetic pole and one S magnetic pole will be referred to as a "magnetic pole pair".

The length λ1 of the magnetic poles 11a, 12a of the first magnetic scale 1a is greater than the length λ2 of the magnetic poles 11b, 12b of the second magnetic scale 1b.

Therefore, the number of magnetic poles on the first magnetic scale 1a and the number of magnetic poles on the second magnetic scale 1b differ from each other when compared over a position detection length L of the magnetic scale 1. Here, the number of magnetic poles on the first magnetic scale 1a is a sum of the number of N magnetic poles 12a and the number of S magnetic poles 11a. Similarly, the number of magnetic poles on the second magnetic scale 1b is a sum of the number of N magnetic poles 12b and the number of S magnetic poles 11b.

In the example shown in FIG. 1, the number of magnetic poles on the first magnetic scale 1a is eight and the number of magnetic poles on the second magnetic scale 1b is six, and therefore a difference between the numbers of magnetic poles is two.

In this embodiment, therefore, the first magnetic scale 1a and the second magnetic scale 1b are formed so that the difference between the respective numbers of magnetic poles thereon is two.

As shown in FIG. 1, when the number of magnetic poles on the first magnetic scale 1a over the length L of the first magnetic scale 1a is set as k, the length λ1 of one magnetic pole 11a, 12a is λ1=L/k. At this time, the number of magnetic poles on the second magnetic scale 1b over the length L of the second magnetic scale 1b is (k+2), and therefore the length λ2 of one magnetic pole 11b, 12b is λ2=L/(k+2).

Note that in FIG. 1, a position detection length L1 of the first magnetic scale 1a and a position detection length L2 of the second magnetic scale 1b are set at an identical length L, but the invention is not limited to this configuration, and instead, L1 and L2 may be set at different lengths. Further, in FIG. 1, the magnetic poles 11a, 12a of the first magnetic scale 1a and the magnetic poles 11b, 12b of the second magnetic scale 1b are rectangular, but the invention is not limited to this configuration, and as long as the respective N poles and S poles have equal lengths and are arranged alternately, the shape thereof may be set as desired. For example, the magnetic poles may be parallelograms. Furthermore, in FIG. 1, the first magnetic scale 1a has six magnetic poles and the second magnetic scale 1b has eight magnetic poles, but the invention is not limited to this configuration, and the respective numbers of magnetic poles on the two magnetic scales may be set as desired as long as the difference therebetween is maintained at two. In the following description, the number of magnetic poles on the first magnetic scale 1a and the number of magnetic poles on the second magnetic scale 1b will be referred to respectively as k and k+2.

The magnetism sensing device 2 is constituted by a first magnetism sensing element group 2a and a second magnetism sensing element group 2b. The first magnetism sensing element group 2a is constituted by n magnetism sensing elements 21a to 21d, and the second magnetism sensing element group 2b is constituted by m magnetism sensing elements 21e to 21g. The magnetism sensing device 2 is disposed opposite the magnetic scale 1 via an air gap W2. The magnetism sensing device 2 may be removed from the magnetic scale 1 by the air gap W2 in either a horizontal direction or a vertical direction. The magnetism sensing device 2 moves relative to the magnetic scale 1 through a magnetic field formed by the magnetic scale 1 in an arrangement direction of the magnetic scale 1 while maintaining the air gap W2, and detects variation in the magnetic field during this relative movement using the n magnetism sensing elements 21a to 21d and the m magnetism sensing elements 21e to 21g. Note that in the magnetic field formed by the magnetic scale 1, a magnetic strength and a magnetic direction of the N poles and S poles forming the magnetic pole pairs of the magnetic scale 1 vary in periods of the magnetic pole pairs. In other words, the magnetic field formed by the first magnetic scale 1a varies in periods of 2×λ1, and the magnetic field formed by the second magnetic scale 1b varies in periods of 2×λ2.

The air gaps W2 between the respective magnetism sensing elements 21a to 21g and the magnetic scale 1 do not have to be identical, and may differ among the magnetism sensing elements 21a to 21g. Note, however, that the air gaps W2 should be maintained as the respective magnetism sensing elements 21a to 21g move relative to the magnetic scale 1. Hall elements, anisotropic magneto-resistive (AMR) devices, giant magneto-resistance (GMR) devices, tunnel magneto-resistive (TMR) devices, or the like are used as the magnetism sensing elements 21a to 21g forming the magnetism sensing device 2. FIG. 1 shows an example in which the first magnetism sensing element group 2a is constituted by four magnetism sensing elements and the second magnetism sensing element group 2b is constituted by three magnetism sensing elements. However, the respective numbers of magnetism sensing elements are not limited thereto, and will be referred to in the following description as n and m.

The n magnetism sensing elements 21a to 21d of the first magnetism sensing element group 2a detect a magnetic field formed by the first magnetic scale 1a. The m magnetism sensing elements 21e to 21g of the second magnetism sensing element group 2b detect a magnetic field formed by the second magnetic scale 1b.

A ratio of the number n of magnetism sensing elements 21a to 21d in the first magnetism sensing element group 2a to the number m of magnetism sensing elements 21e to 21g in the second magnetism sensing element group 2b is set at a ratio of an inverse of the number k of magnetic poles on the first magnetic scale 1a to an inverse of the number (k+2) of magnetic poles on the second magnetic scale 1b (n:m=(1/k):(1/(k+2))). Hence, the number n of magnetism sensing elements 21 in the first magnetism sensing element group 2a and the number m of magnetism sensing elements 21 in the second magnetism sensing element group 2b can be expressed respectively by Equations (1) and (2), shown below.

$$n = k/2 + 1 \quad (1)$$

$$m = k/2 \quad (2)$$

Note that one of the number n of magnetism sensing elements 21 in the first magnetism sensing element group 2a and the number m of magnetism sensing elements 21 in the second magnetism sensing element group 2b may be reduced. As is evident from Equations (1) and (2), one of n and m is an even number and the other is an odd number. When the even number of magnetism sensing elements 21 is to be reduced, the number of magnetism sensing elements may be halved, and when the odd number of magnetism sensing elements 21 is to be reduced, the number of magnetism sensing elements may be halved after adding 1 thereto.

For example, when the number n of magnetism sensing elements in the first magnetism sensing element group 2a, calculated using Equation (1), is even and the number m of magnetism sensing elements in the second magnetism sensing element group 2b, calculated using Equation (2), is odd, and the number n of magnetism sensing elements in the first magnetism sensing element group 2a is reduced, n and m are expressed respectively by Equations (3) and (4), shown below.

$$n = (k/2 + 1) \times (1/2) \qquad (3)$$
$$= k/4 + 1/2$$

$$m = k/2 \qquad (4)$$

Alternatively, when the number n of magnetism sensing elements in the first magnetism sensing element group 2a is even and the number m of magnetism sensing elements in the second magnetism sensing element group 2b is odd, and the number m of magnetism sensing elements in the second magnetism sensing element group 2b is reduced, n and m are expressed respectively by Equations (5) and (6), shown below.

$$n = k/2 + 1 \qquad (5)$$

$$m = (k/2 + 1) \times (1/2) \qquad (6)$$
$$= k/4 + 1/2$$

On the other hand, when the number n of magnetism sensing elements 21 in the first magnetism sensing element group 2a, calculated using Equation (1), is odd and the number m of magnetism sensing elements 21 in the second magnetism sensing element group 2b, calculated using Equation (2), is even, and the number n of magnetism sensing elements in the first magnetism sensing element group 2a is reduced, n and m are expressed respectively by Equations (7) and (8), shown below.

$$n = (k/2 + 1 + 1) \times (1/2) \qquad (7)$$
$$= (k/2 + 2) \times (1/2)$$
$$= k/4 + 1$$

$$m = k/2 \qquad (8)$$

Further, when the number m of magnetism sensing elements in the second magnetism sensing element group 2b is reduced, n and m are expressed respectively by Equations (9) and (10), shown below.

$$n = k/2 + 1 \qquad (9)$$

$$m = (k/2) \times (1/2) \qquad (10)$$
$$= k/4$$

When of magnetism sensing elements in the first magnetism sensing element group 2a is calculated at n using Equation (1) and the number of magnetism sensing elements in the second magnetism sensing element group 2b is calculated at m using Equation (2), an arrangement interval between the magnetism sensing elements 21 of the first magnetism sensing element group 2a and an arrangement interval between the magnetism sensing elements 21 of the second magnetism sensing element group 2b are set respectively at P1 and P2. Here, as indicated by P in FIG. 1, a length of the arrangement intervals P1, P2 is set to extend from one end of one magnetism sensing element 21 in a movement direction to the end of the adjacent magnetism sensing element 21 on the same side.

The arrangement intervals P1 between the magnetism sensing elements 21a to 21d of the first magnetism sensing element group 2a are all equal. As shown in FIG. 1, the n magnetism sensing elements 21a to 21d are disposed within a range corresponding to the length λ1 (=L/k) of one magnetic pole 11a or 12a. More specifically, a combined length (P1×n) of the arrangement intervals P1 between the n magnetism sensing elements 21a to 21d is identical to the length (L/k) of one magnetic pole 11a or 12a of the first magnetic scale 1a.

Similarly, the arrangement intervals P2 between the magnetism sensing elements 21e to 21g of the second magnetism sensing element group 2b are all equal. As shown in FIG. 1, the m magnetism sensing elements 21e to 21g are disposed within a range corresponding to the length λ2 (=L/(k+2)) of one magnetic pole 11b or 12b. More specifically, a combined length (P2×m) of the arrangement intervals P2 between the m magnetism sensing elements 21e to 21g is identical to the length (L/(k+2)) of one magnetic pole 11b or 12b of the second magnetic scale 1b.

Therefore, when the position detection length of the first magnetic scale 1a and the position detection length of the second magnetic scale 1b are set respectively as L1 and L2, the arrangement interval P1 between the magnetism sensing elements 21 of the first magnetism sensing element group 2a and the arrangement interval P2 between the magnetism sensing elements 21 of the second magnetism sensing element group 2b are expressed respectively by Equations (11) and (12), shown below.

$$P1 = L1/n/k \qquad (11)$$

$$P2 = L2/m/(k+2) \qquad (12)$$

In FIG. 1, the position detection length L1 of the first magnetic scale 1a and the position detection length L2 of the second magnetic scale 1b are set at the same length L, and therefore the arrangement interval P1 between the magnetism sensing elements 21 of the first magnetism sensing element group 2a and the arrangement interval P2 between the magnetism sensing elements 21 of the second magnetism sensing element group 2b have an identical length P. Note that the magnetism sensing elements 21a to 21g do not have to be disposed in a straight line so as to be parallel to the movement direction relative to the magnetic scales 1a, 1b, and as long as the magnetic fields formed by the magnetic scale 1 can be detected while maintaining the arrangement interval P at which the respective magnetism sensing elements 21a to 21d are disposed, the magnetism sensing elements 21a to 21g may be arranged as desired.

Note that when the value of n is calculated using Equation (3) and the value of m is calculated using Equation (4), or when the value of n is calculated using Equation (9) and the value of m is calculated using Equation (10), P1 calculated in Equation (11) and P2 calculated in Equation (12) may be employed as the arrangement intervals P. When the value of n is calculated using Equation (5) and the value of m is calculated using Equation (6), on the other hand, the arrangement interval P1 between the magnetism sensing elements 21 of the first magnetism sensing element group 2a and the arrangement interval P2 between the magnetism sensing elements 21 of the second magnetism sensing element group 2*b* are expressed respectively by Equations (13) and (14), shown below.

$$P1 = L1/n/k \quad (13)$$

$$P2 = L2/(m-1/2)/(k+2) \quad (14)$$

However, the arrangement interval P2 between the magnetism sensing elements 21 of the second magnetism sensing element group 2*b* does not have to be constituted only by P2 calculated using Equation (14). More specifically, the arrangement interval of only one of the magnetism sensing elements may be set at P2', as shown below in Equation (15), while the other arrangement intervals of the magnetism sensing device are set at P2 calculated using Equation (14).

$$P2' = L2/(2 \times m - 1)/(k+2) \quad (15)$$

Further, when the value of n is calculated using Equation (7) and the value of m is calculated using Equation (8), the arrangement interval P1 between the magnetism sensing elements 21 of the first magnetism sensing element group 2*a* and the arrangement interval P2 between the magnetism sensing elements 21 of the second magnetism sensing element group 2*b* are expressed respectively by Equations (16) and (17), shown below.

$$P1 = L1/(n-1/2)/k \quad (16)$$

$$P2 = L2/m/(k+2) \quad (17)$$

However, the arrangement interval P1 between the magnetism sensing elements 21 of the first magnetism sensing element group 2*a* does not have to be constituted only by P1 calculated using Equation (16). More specifically, the arrangement interval of only one of the magnetism sensing elements 21*a* to 21*d* in the first magnetism sensing element group 2*a* may be set at P1', as shown below in Equation (18), while the other arrangement intervals of the magnetism sensing device are set at P1 calculated using Equation (16).

$$P1' = L1/(2 \times n - 1)/k \quad (18)$$

Figure 2:
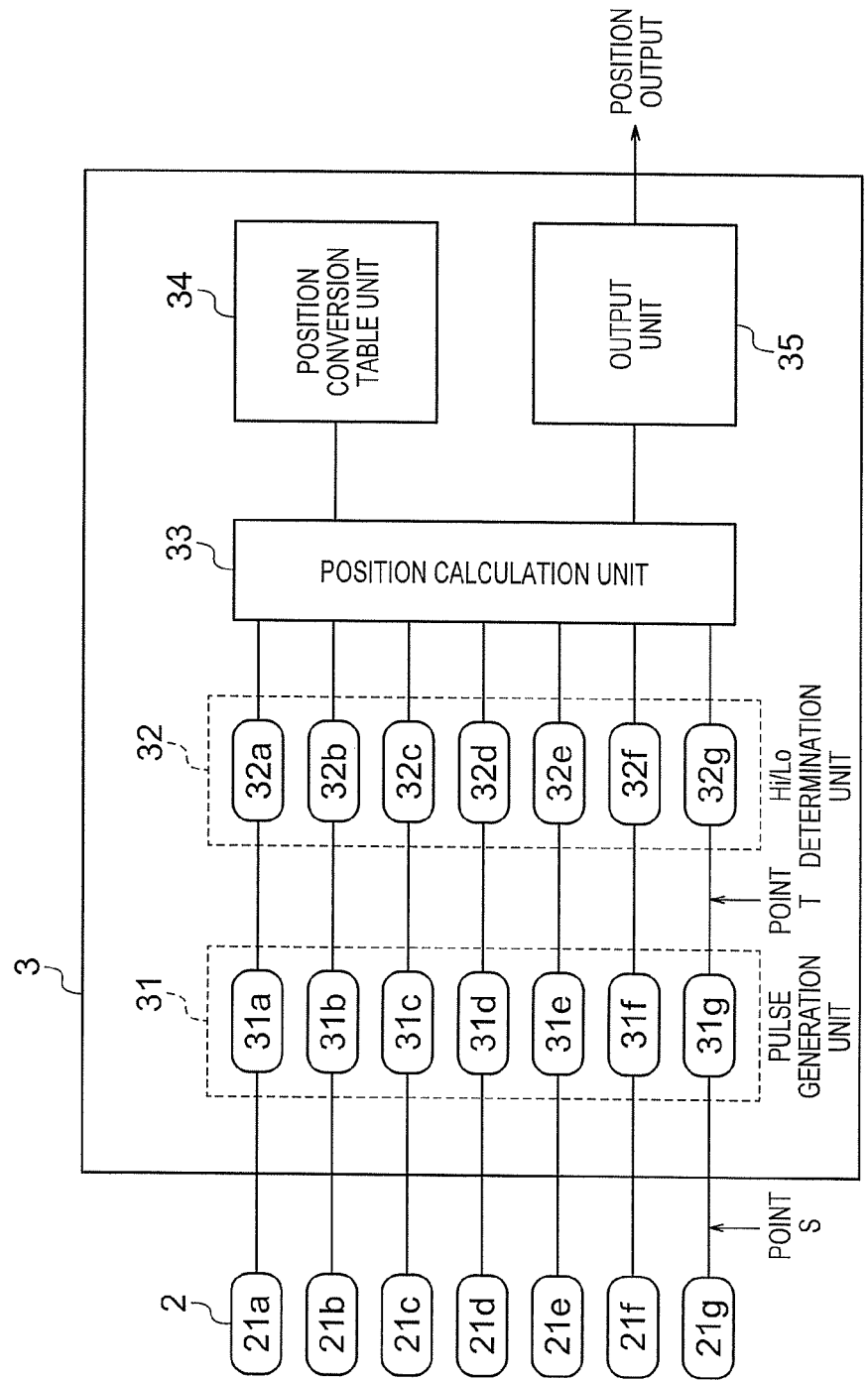
FIG. 2 is a view showing an example configuration of a position calculation device according to the first embodiment of this invention.

FIG. 2 is a view showing an example configuration of the position calculation device 3 according to the first embodiment of this invention. The position calculation device 3 calculates a relative position of the magnetism sensing device 2 on the magnetic scale 1 by analyzing the output values of the magnetism sensing device 2. As shown in FIG. 2, the position calculation device 3 includes a pulse generation unit 31, a Hi/Lo determination unit 32, a position calculation unit 33, a position conversion table unit 34, and an output unit 35.

The pulse generation unit 31 is connected to the magnetism sensing device 2. The pulse generation unit 31 converts outputs shown in FIG. 3(*a*), to be described below, of the magnetism sensing elements 21*a* to 21*g* of the magnetism sensing device 2 into pulse outputs 31*a* to 31*g* shown in FIG. 3(*b*), to be described below.

The Hi/Lo determination unit 32 is connected to the pulse generation unit 31. The Hi/Lo determination unit 32 binarizes the pulse outputs 31*a* to 31*g* output by the pulse generation unit 31 by determining whether the pulse outputs 31*a* to 31*g* are Hi or Lo, and outputs the binarized pulse outputs as Hi/Lo outputs 32*a* to 32*g*. Note that the Hi/Lo outputs 32*a* to 32*g* are constituted by either a Hi signal or a Lo signal.

The position calculation unit 33 calculates an absolute position on the magnetic scale 1 by referring to table data shown in FIG. 4(*b*), to be described below, using the Hi/Lo outputs 32*a* to 32*g* from the Hi/Lo determination unit 32.

The position conversion table unit 34 (a storage unit) is connected to the position calculation unit 33, and the aforesaid table data are stored therein in advance.

The output unit 35 is connected to the position calculation unit 33, and outputs information indicating the position on the magnetic scale 1 calculated by the position calculation unit 33.

Operations performed by the respective units 31 to 35 will now be described.

Output signals from the magnetism sensing elements 21*a* to 21*g* of the magnetism sensing device 2 are input into the pulse generation unit 31. As shown in FIG. 3(*a*), to be described below, the output signals from the magnetism sensing elements 21*a* to 21*g* are signals resembling sine waves. The output signals from the magnetism sensing elements 21*a* to 21*g* are at zero in changeover parts between the N poles and the S poles of the magnetic scale 1, and switch either from positive to negative or from negative to positive at the changeover parts. The pulse generation unit 31 converts the output signals from the magnetism sensing elements 21*a* to 21*g* into pulse outputs (rectangular waves) 31*a* to 31*g*, as shown in FIG. 3(*b*). These pulse outputs are pulse waves that reverse at the changeover parts between the N poles and the S poles of the magnetic scale 1.

The Hi/Lo determination unit 32 determines whether the pulse outputs 31*a* to 31*g* output by the pulse generation unit 31 are Hi or Lo, and outputs the Hi/Lo outputs 32*a* to 32*g* (Hi signals or Lo signals).

The position calculation unit 33 calculates absolute position information by reading the table data stored in the position conversion table unit 34 using the Hi/Lo outputs 32*a* to 32*g* (Hi signals or Lo signals) from the Hi/Lo determination unit 32.

Figure 4:
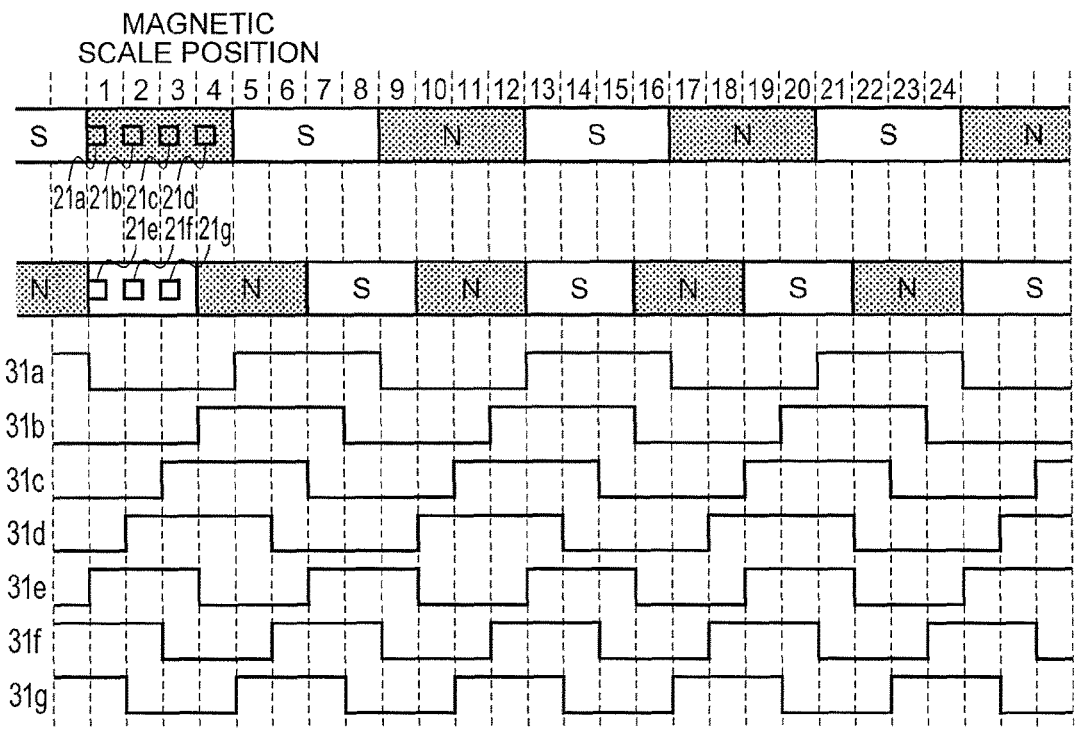
FIG. 4 is a view showing an example of respective outputs of the pulse generation unit and a Hi/Lo determination unit and positions on the magnetic scale obtained when the magnetism sensing device moves relative to the magnetic scale, according to the first embodiment of this invention.

As shown in FIG. 4(*b*), signal patterns of the Hi/Lo outputs 32*a* to 32*g* output by the Hi/Lo determination unit 32 and information indicating absolute positions (1 to 24) of the magnetism sensing device 2 on the magnetic scale 1 are turned into table data are stored in the position conversion table unit 34 in advance.

The output unit 35 is a transmission interface that outputs the information indicating the absolute position of the magnetism sensing device 2 on the magnetic scale 1, output by the position calculation unit 33.

FIG. 3 is a view showing output waveforms output by the magnetism sensing device 2 and the pulse generation unit 31 when the magnetism sensing device 2 moves relative to the magnetic scale 1, according to the first embodiment of this invention.

FIG. 3(*a*) shows output waveforms output by the magnetism sensing elements 21*a* to 21*g* at a point S in FIG. 2 during the relative movement of the magnetism sensing device 2. Variation in the magnetic field during the relative movement of the magnetism sensing device 2 is output in parallel by the magnetism sensing elements 21*a* to 21*g*.

FIG. 3(*b*) shows output waveforms output by the pulse generation unit 31 at a point T in FIG. 2 during the relative movement of the magnetism sensing device 2.

As shown in FIG. 3(*a*), the output waveforms of the magnetism sensing elements 21*a* to 21*g*, although dependent on the characteristics of the employed magnetism sensing device 2 and magnetic scale 1, are typically substantially sine wave-shaped waveforms. When the output waveforms of the magnetism sensing elements 21*a* to 21*d* in the first magnetism sensing element group 2*a* are compared with the output waveforms of the magnetism sensing elements 21*e* to 21*g* in the second magnetism sensing element group 2*b* at this time, the respective waveforms have different periods.

The reason for this is that the difference between the length 2×λ1 of each magnetic pole pair (11a and 12a) of the magnetic scale 1a and the length 2×λ2 of each magnetic pole pair (11b and 12b) of the magnetic scale 1b serves as the period difference.

The respective output waveforms of the magnetism sensing elements 21a to 21d in the first magnetism sensing element group 2a exhibit successive phase shifts corresponding to the arrangement interval P1 between the magnetism sensing elements 21 of the first magnetism sensing element group 2a.

Similarly, the respective output waveforms of the magnetism sensing elements 21e to 21g in the second magnetism sensing element group 2b exhibit successive phase shifts corresponding to the arrangement interval P2 between the magnetism sensing elements 21 of the second magnetism sensing element group 2b.

Note that in FIG. 3, the period of the output waveforms of the magnetism sensing elements 21a to 21g is set at one period to one magnetic pole pair, but this invention is not limited thereto, and in an anisotropic magneto-resistive device, the output waveform may be set at one period to one magnetic pole, while in a Hall element, a giant magneto-resistive device, and a tunnel magneto-resistive device, the output waveform may beset at one period to one magnetic pole pair. In FIG. 1, the magnetism sensing elements 21a to 21g of the magnetism sensing device 2 are disposed relative to one magnetic pole of the magnetic scale 1, but this invention is not limited thereto, and instead, for example, the output waveforms of the magnetism sensing elements 21a to 21g shown in FIG. 3(a) may be obtained by means of a bridge configuration in which a magnetism sensing element is disposed on the N pole of the magnetic scale 1, a magnetism sensing element is disposed on the S pole of the magnetic scale 1, and these two magnetism sensing elements are disposed at a distance from each other corresponding to the length of one magnetic pole.

The output waveforms of the pulse outputs 31a to 31g output by the pulse generation unit 31, as shown in FIG. 3(b), are pulse-shaped waveforms having a duty ratio of substantially 50%.

Similarly to the output waveforms of the magnetism sensing elements 21a to 21g, the output waveforms of the pulse outputs 31a to 31d output by the pulse generation unit 31 and the output waveforms of the pulse outputs 31e to 31g output by the pulse generation unit 31 have different periods. The reason for this is that the difference between the length of each magnetic pole pair of the magnetic scale 1a and the length of each magnetic pole pair of the magnetic scale 1b serves as the period difference.

The respective output waveforms of the pulse outputs 31a to 31d output by the pulse generation unit 31 exhibit successive phase shifts corresponding to the arrangement interval P1 between the magnetism sensing elements 21 of the first magnetism sensing element group 2a.

Similarly, the respective output waveforms of the pulse outputs 31e to 31g output by the pulse generation unit 31 exhibit successive phase shifts corresponding to the arrangement interval P2 between the magnetism sensing elements 21 of the second magnetism sensing element group 2b.

FIG. 4(a) shows an example of the arrangement of the magnetic scale 1 and the magnetism sensing device 2 and the output signals output by the pulse generation unit 31 when the magnetism sensing device 2 moves relative to the magnetic scale 1, according to the first embodiment of this invention.

FIG. 4(b) shows an example of the table data stored in the position conversion table unit 34.

FIG. 4(a) shows the arrangement of the magnetic scale 1 and the magnetism sensing device 2 and the pulse outputs 31a to 31g output by the pulse generation unit 31 when the magnetism sensing device 2 moves relative to the magnetic scale 1 in the form of a timing chart. Here, magnetic scale positions shown on the abscissa of FIG. 4(a) denote absolute positions of the magnetism sensing device 2 relative to the magnetic scale 1.

FIG. 4(b) shows an example of the stored table data, in which the magnetic scale positions are associated with signal patterns of the Hi/Lo outputs (Hi signals or Lo signals) output by the Hi/Lo determination unit 32 when the magnetism sensing device 2 moves relative to the magnetic scale 1. When the magnetism sensing device 2 moves relative to the magnetic scale 1, the Hi/Lo determination unit 32 determines whether respective signal levels of the pulse outputs 31a to 31g output by the pulse generation unit 31 are Hi or Lo (i.e. performs a Hi/Lo determination), and outputs Hi signals or Lo signals as determination results.

In the table data shown in FIG. 4(b), the absolute position information (1 to 24) calculated by the position calculation device 3 as the magnetism sensing device 2 moves relative to the magnetic scale 1 is shown on row 1. Hi/Lo signal patterns of the Hi/Lo outputs 32a to 32g output by the Hi/Lo determination unit 32 are shown on rows 2 to 8 of FIG. 4(b) in association with the information indicating the respective absolute positions (1 to 24) on the magnetic scale 1.

It can be seen from FIGS. 4(a) and 4(b) that of the Hi/Lo outputs 32a to 32g output by the Hi/Lo determination unit 32, the Hi/Lo outputs 32a to 32d vary in similar periods to the magnetic pole pairs of the magnetic scale 1a, while the Hi/Lo outputs 32e to 32g vary in similar periods to the magnetic pole pairs of the magnetic scale 1b. It can also be seen that the Hi/Lo pattern of the Hi/Lo outputs 32a to 32g is different in each magnetic scale position.

Hence, in this embodiment, the position calculation unit 33 creates the table data shown in FIG. 4(b) in advance, and stores the created table data in the position conversion table unit 34 (the storage unit). Then, having received the Hi/Lo outputs 32a to 32g from the Hi/Lo determination unit 32, the position calculation unit 33 obtains the corresponding absolute position on the magnetic scale 1 by reading the absolute position from the table data.

For example, when the Hi/Lo outputs 32a to 32g from the Hi/Lo determination unit 32 are all Hi, the position calculation unit 33 determines that the endmost magnetism sensing element 21a of the first magnetism sensing element group 2a and the endmost magnetism sensing element 21e of the second magnetism sensing element group 2b are in position "13" on the magnetic scale 1.

Further, when the Hi/Lo outputs 32a to 32e from the Hi/Lo determination unit 32 are Hi and the Hi/Lo outputs 32f and 32g are Lo, the position calculation unit 33 determines that the magnetism sensing elements 21a and 21e of the magnetism sensing device 2 are in position "21" on the magnetic scale 1.

The output unit 35 shown in FIG. 2 then outputs information indicating the position on the magnetic scale 1, output by the position calculation unit 33.

Hence, information indicating the absolute position of the magnetism sensing device 2 on the magnetic scale 1 can be detected from the Hi/Lo signal pattern determined from the output signals output by the magnetism sensing elements 21a to 21g of the magnetism sensing device 2. One Hi/Lo signal pattern corresponds to a resolution of the absolute position of the magnetism sensing device 2 on the magnetic scale 1, and changeovers between the signal patterns are determined in accordance with the arrangement intervals P1, P2 between the magnetism sensing elements 21 of the magnetism sensing device 2. Therefore, when a resolution of the absolute positions of the first magnetism sensing element group 2a on the first magnetic scale 1a is set at δ1 and the resolution of the absolute positions of the second magnetism sensing element group 2b on the second magnetic scale 1b is set at δ2, δ1 and δ2 are expressed respectively by Equations (19) and (20), shown below.

$$\delta 1 = L1/n/k \quad (19)$$

$$\delta 2 = L2/m/(k+2) \quad (20)$$

The value of n used to calculate the resolution δ1 and the value of m used to calculate the resolution δ2 are determined from the value of n calculated using Equation (1) and the value of m calculated using Equation (2), respectively, and not from the values of Equations (3) to (18), in which the values of n and m are reduced. Note that in FIG. 1, respective absolute position detection ranges of the first magnetic scale 1a and the second magnetic scale 1b have the same length L, and therefore the arrangement interval δ1 between the magnetism sensing elements 21 of the first magnetism sensing element group 2a and the arrangement interval δ2 between the magnetism sensing elements 21 of the second magnetism sensing element group 2b are also identical.

In the first embodiment, as described above, the two magnetic scales 1a, 1b are provided, and the magnetism sensing device 2 is disposed opposite the respective magnetic scales 1a, 1b via predetermined air gaps. The magnetic scales 1a, 1b are formed by arranging the magnetic poles 11a, 12a, 11b, 12b, which are constituted by S poles and N poles, alternately. The difference between the respective numbers of magnetic poles on the magnetic scales 1a, 1b is two. The magnetism sensing device 2 is constituted by the plurality of magnetism sensing elements 21a to 21g. The magnetism sensing elements 21a to 21d and 21e to 21g are arranged at intervals of the arrangement interval P in accordance with the length of one magnetic pole of the magnetic scales 1a, 1b. Thus, when the magnetism sensing device 2 is moved relative to the magnetic scales 1a, 1b, the absolute position of the magnetism sensing device 2 on the magnetic scales 1a, 1b is calculated by detecting variation in the magnetic fields formed by the magnetic scales 1a, 1b using the magnetism sensing elements.

As a result, the absolute position of the magnetism sensing device 2 relative to the magnetic scale 1 can be detected by the n or m magnetism sensing elements 21 within the same length L of the two magnetic scales 1a, 1b having k magnetic poles and k+2 magnetic poles, respectively, at a position detection resolution of $\delta = L/n/k = L/m/(k+2)$. According to this embodiment, therefore, a magnetic position detection device and a magnetic position detection method enabling a high speed response by means of a simple configuration can be obtained.

Second Embodiment

In a second embodiment of this invention, a magnetic position detection device and method employed in a case where the number of magnetism sensing elements 21 in the first magnetism sensing element group 2a and the number of magnetism sensing elements 21 in the second magnetism sensing element group 2b are increased in comparison with the first embodiment will be described. In the second embodiment, the resolution is improved in comparison with the first embodiment by increasing the numbers of the magnetism sensing elements 21, and as a result, increased precision is obtained.

Figure 5:
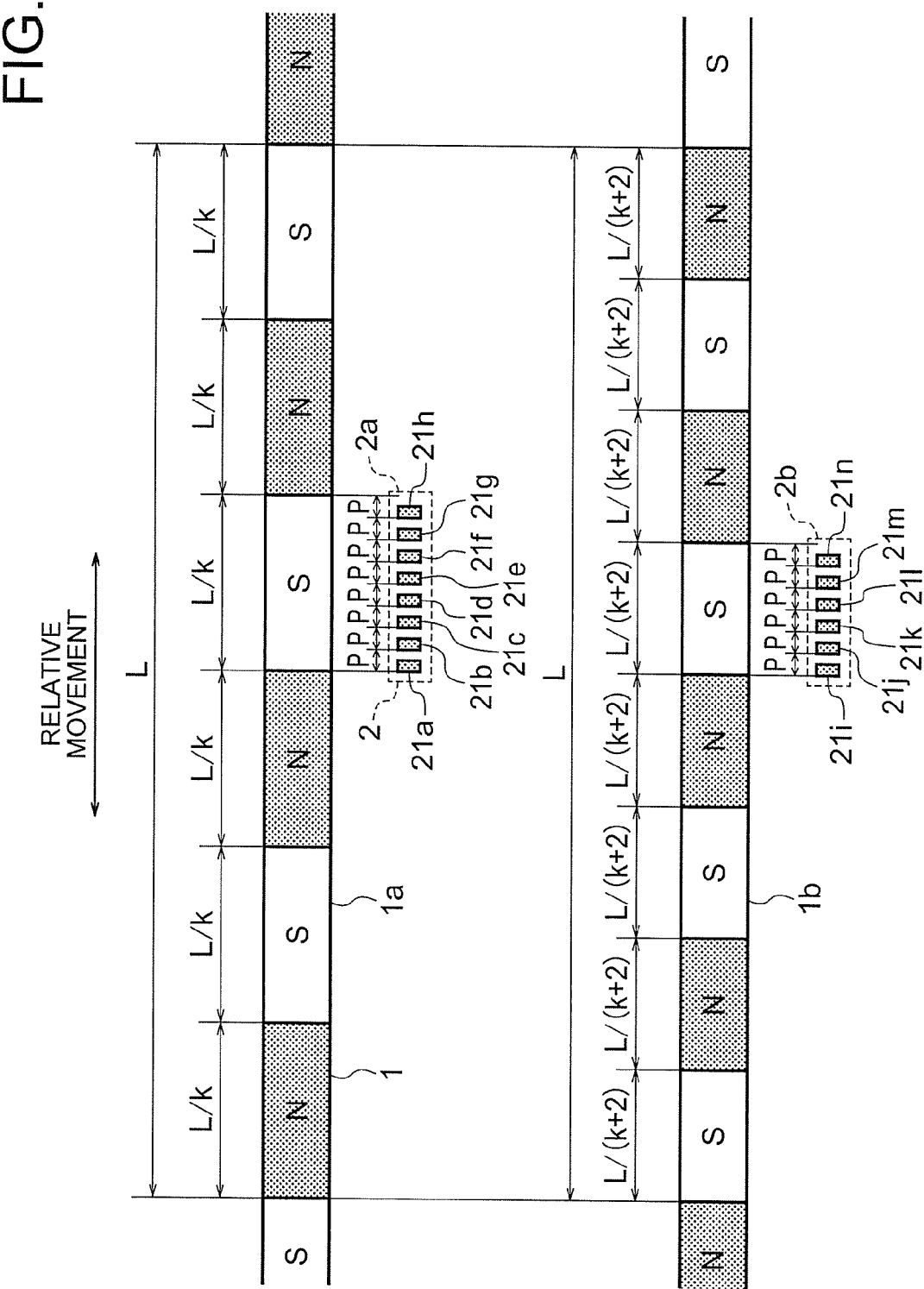
FIG. 5 is a view showing an arrangement of a magnetic scale and magnetism sensing elements according to a second embodiment of this invention.

FIG. 5 is a view showing an example configuration of the magnetic position detection device according to the second embodiment. A feature of the magnetic position detection device according to the second embodiment is that the numbers of the magnetism sensing elements 21 respectively forming the first magnetism sensing element group 2a and the second magnetism sensing element group 2b of the magnetism sensing device 2 are increased in comparison with the first embodiment. All other configurations are identical to the first embodiment, and therefore description thereof has been omitted.

The first magnetism sensing element group 2a is constituted by magnetism sensing elements 21a to 21h. A number $n_{multi}$ of the magnetism sensing elements 21a to 21h is double the number n of magnetism sensing elements 21a to 21d according to the first embodiment. An arrangement interval $P1_{multi}$ between the magnetism sensing elements 21 constituting the magnetism sensing elements 21a to 21h of the first magnetism sensing element group 2a at this time is half the arrangement interval P1 of the first embodiment. Likewise in this embodiment, similarly to the first embodiment, the magnetism sensing elements 21 are arranged uniformly within the range of one magnetic pole 11a or 12a.

Similarly, the second magnetism sensing element group 2b is constituted by magnetism sensing elements 21i to 21n. A number $m_{multi}$ of the magnetism sensing elements 21i to 21n is double the number m of magnetism sensing elements 21e to 21g according to the first embodiment. An arrangement interval $P2_{multi}$ between the magnetism sensing elements 21 constituting the magnetism sensing elements 21i to 21n of the second magnetism sensing element group 2b at this time is half the arrangement interval P2 of the first embodiment. Likewise in this embodiment, similarly to the first embodiment, the magnetism sensing elements 21 are arranged uniformly within the range of one magnetic pole 11b or 12b.

In FIG. 5, the position detection length L1 of the first magnetic scale 1a and the position detection length L2 of the second magnetic scale 1b are set at an identical length L. Accordingly, the arrangement interval $P1_{multi}$ between the magnetism sensing elements 21 in the first magnetism sensing element group 2a and the arrangement interval $P2_{multi}$ between the magnetism sensing elements 21 in the second magnetism sensing element group 2b are set at an identical arrangement interval $P_{multi}$.

Figure 6:
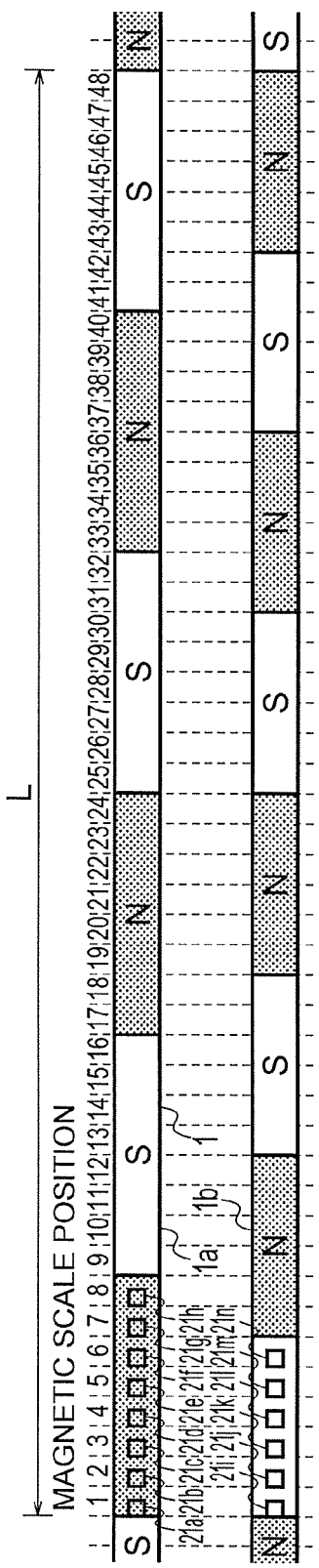
FIG. 6 is a view showing an example of outputs of a Hi/Lo determination unit and positions on the magnetic scale obtained when a magnetism sensing device moves relative to the magnetic scale, according to the second embodiment of this invention.

FIG. 6 shows an example of the arrangement of the magnetic scale 1 and the magnetism sensing device 2 and the table data stored in the position conversion table unit 34 according to the second embodiment. Likewise in the second embodiment, Hi/Lo outputs 32a to 32n output by the Hi/Lo determination unit 32 as the magnetism sensing device 2 moves relative to the magnetic scale 1 and positions on the magnetic scale are stored in association with each other in the table data.

As shown in FIG. 6, the magnetism sensing elements 21a to 21h of the first magnetism sensing element group 2a are disposed in relation to the magnetic field formed by the first magnetic scale 1a. Further, the magnetism sensing elements 21i to 21n of the second magnetism sensing element group 2b are disposed in relation to the magnetic field formed by the second magnetic scale 1b. Note that information indicating positions (1 to 48) is provided on the magnetic scale 1 shown in FIG. 6 over the position detection length L.

Further, FIG. 6 shows the table data stored in the position conversion table unit 34, in which the Hi/Lo outputs 32a to 32n output by the Hi/Lo determination unit 32 as the magnetism sensing device 2 moves over the position detection length L of the magnetic scale 1 are associated with information indicating positions on the magnetic scale 1 corresponding to the values of the Hi/Lo outputs 32a to 32n. In the table data shown in FIG. 6, the information indicating the position (1 to 48) on the magnetic scale 1 is shown on row 1, and signal patterns of the Hi/Lo outputs 32a to 32n output by the Hi/Lo determination unit 32 are shown on rows 2 to 15 in association with the information indicating the respective positions (1 to 48) on the magnetic scale 1. The position calculation unit 33 creates the table data shown in FIG. 6 in advance, and stores the created table data in the position conversion table unit 34.

For example, when the Hi/Lo outputs 32a to 32n from the Hi/Lo determination unit 32 are all Hi, the position calculation unit 33 determines that the endmost magnetism sensing element 21a of the first magnetism sensing element group 2a and the endmost magnetism sensing element 21i of the second magnetism sensing element group 2b are in position "25" on the magnetic scale 1. Further, when the Hi/Lo outputs 32a to 32j from the Hi/Lo determination unit 32 are Hi and the Hi/Lo outputs 32k and 32n are Lo, the position calculation unit 33 determines that the magnetism sensing elements 21a and 21i of the magnetism sensing device 2 are in position "41" on the magnetic scale 1.

In the second embodiment, as described above, the number of magnetism sensing elements 21 in the first magnetism sensing element group 2a and the number of magnetism sensing elements 21 in the second magnetism sensing element group 2b are respectively doubled in comparison with the first embodiment. Likewise in the second embodiment, similarly to the first embodiment, the absolute position is detected within the position detection length L of the magnetic scale 1. At this time, the resolution of the second embodiment is halved. Note that the numbers of the magnetism sensing elements 21 are not limited to those described above.

By setting the numbers of the magnetism sensing elements 21 constituting the magnetism sensing device 2 respectively at i and j times the numbers n and m of the first embodiment, as shown in Equations (1) and (2), in this manner, the position detection resolution can be varied. The position detection resolution is determined in accordance with the larger numerical value of i and j. i and j may be any natural numbers, and may be set at different values to each other. When i and j are set at different values to each other, the smaller value must be a divisor of the larger value. For example, when i is set as the larger value and the value of i is set at 6, j may be set at 1, 2, or 3. Alternatively, j may be set at the same value, i.e. 6. Thus, the number $n_{multi}$ of magnetism sensing elements in the first magnetism sensing element group 2a, the number $m_{multi}$ of magnetism sensing elements in the second magnetism sensing element group 2b, the arrangement interval $P1_{multi}$ between the magnetism sensing elements of the first magnetism sensing element group 2a, the arrangement interval $P2_{multi}$ between the magnetism sensing elements of the second magnetism sensing element group 2b, a resolution $\delta1_{multi}$ of the absolute positions of the first magnetism sensing element group 2a on the first magnetic scale 1a, and a resolution $\delta2_{multi}$ of the absolute positions of the second magnetism sensing element group 2b on the second magnetic scale 1b when n and m are multiplied respectively by i and j are derived respectively from Equation (1), Equation (2), Equation (11), Equation (12), Equation (19), and Equation (20) according to the first embodiment so as to be expressed as shown below. Here, h denotes the larger numerical value of i and j.

$$n_{multi}=n\times i=(k+2)/2\times i \quad (21)$$

$$m_{multi}=m\times j=k/2\times j \quad (22)$$

$$P1_{multi}=P1/i=L1/n/k/i \quad (23)$$

$$P2_{multi}=P2/j=L2/m/(k+2)/j \quad (24)$$

$$\delta1_{multi}=\delta1/h=L1/n/k/h \quad (25)$$

$$\delta2_{multi}=\delta2/h=L2/m/(k+2)/h \quad (26)$$

When one of i and j is set at 1, the number of magnetism sensing elements 21 in the first magnetism sensing element group 2a or the number of magnetism sensing elements 21 in the second magnetism sensing element group 2b may be reduced using Equations (3) to (10) of the first embodiment.

Hence, according to the second embodiment, the position detection resolution can be varied by varying the number of magnetism sensing elements 21 disposed over the position detection length L of the magnetic scale 1. By increasing the number of magnetism sensing elements 21, therefore, a magnetic position detection device and a magnetic position detection method exhibiting a high degree of precision can be obtained.

Third Embodiment

In a third embodiment, a magnetic position detection device and method in which the magnetic scale is formed in a circular shape so that a rotation angle can be detected will be described.

Figure 7:
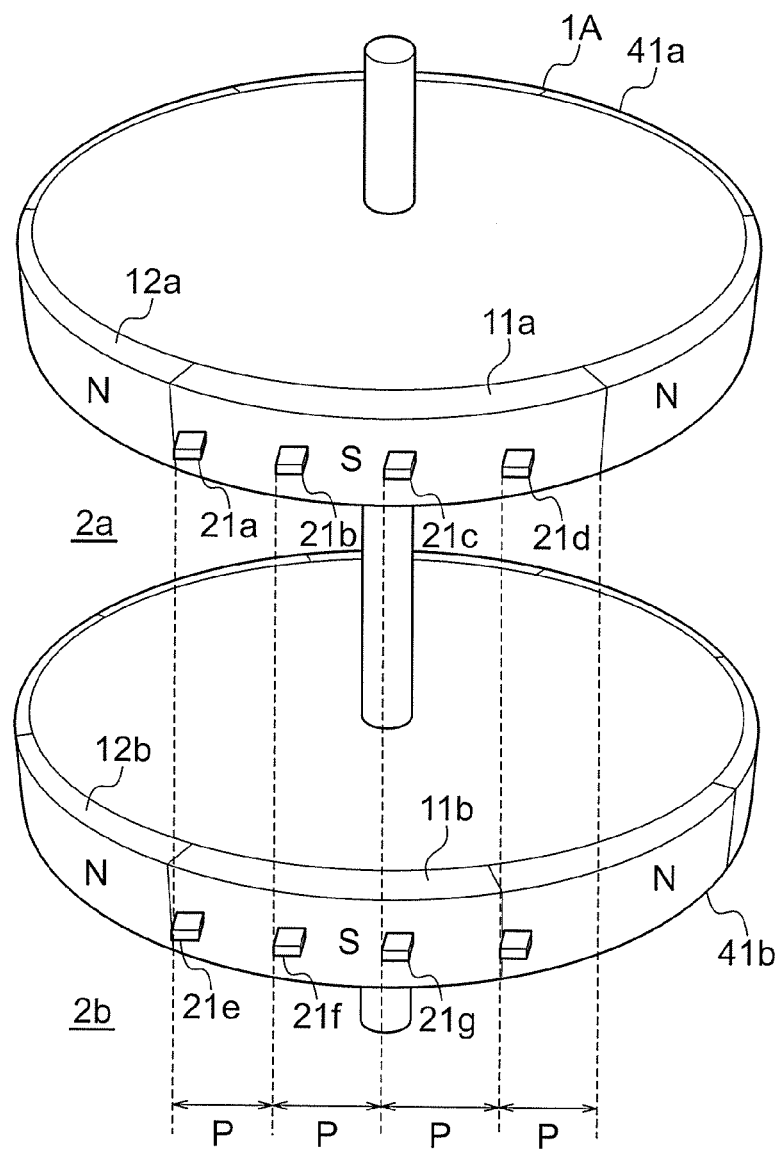
FIG. 7 is a view showing an arrangement of a magnetic scale and magnetism sensing elements according to a third embodiment of this invention.

FIG. 7 is a view showing an example configuration of the magnetic position detection device according to the third embodiment of this invention. A feature of the magnetic position detection device according to the third embodiment is that the magnetic scale 1 of the first embodiment, described above, is formed from an annular or circular magnetic rotor 1A so that a rotation angle is detected. All other configurations are identical to the first embodiment, and therefore description thereof has been omitted.

Figure 8:
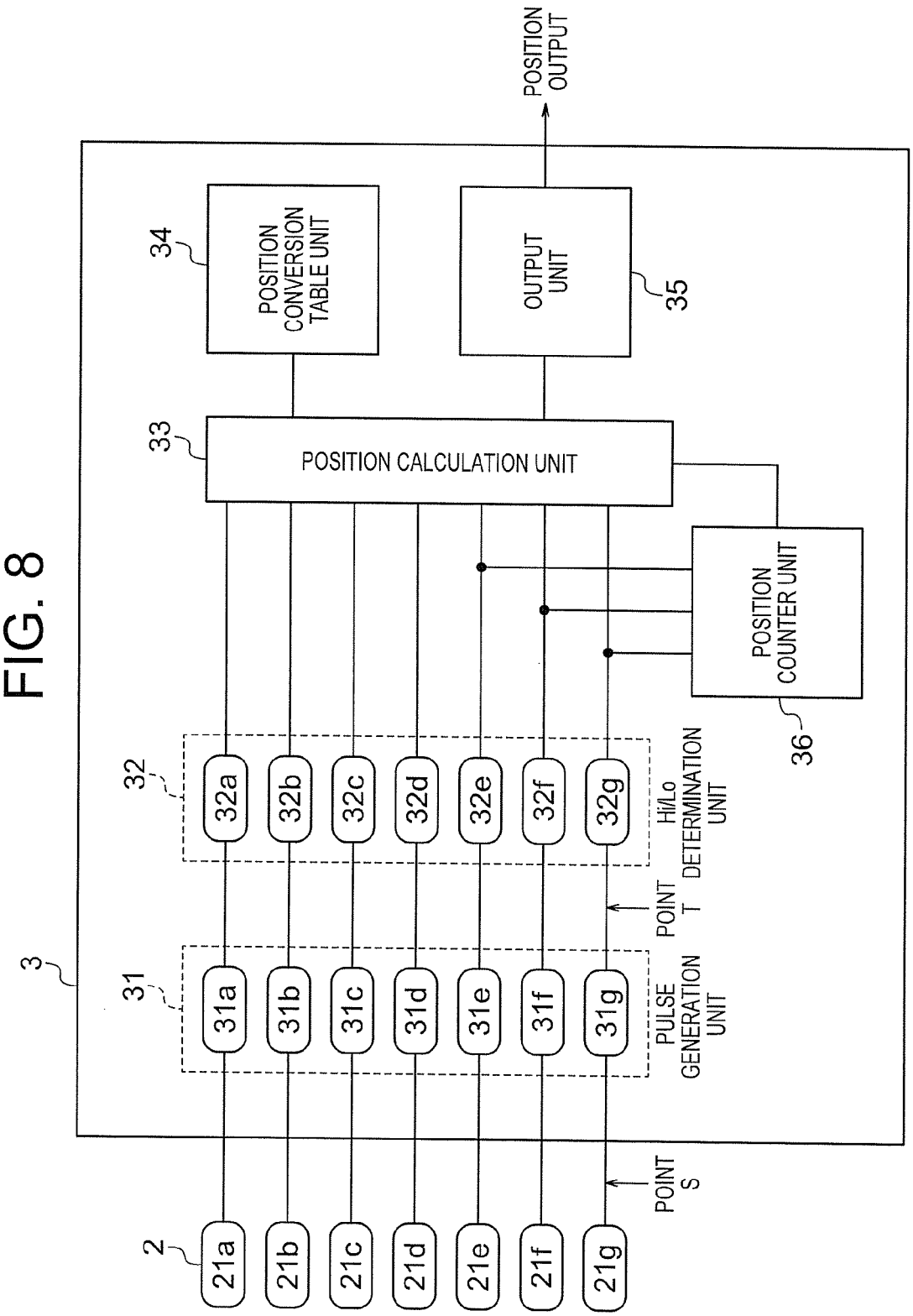
FIG. 8 is a view showing an example configuration of a position calculation device according to a fourth embodiment of this invention.

The magnetic position detection device according to the third embodiment is constituted by the magnetic rotor 1A, the magnetism sensing device 2, and the position calculation device 3 (not shown in FIG. 7; see FIG. 8).

The magnetic rotor 1A is constituted by a first magnetic rotor 41a and a second magnetic rotor 41b. The first magnetic rotor 41a and the second magnetic rotor 41b are disposed coaxially so as to oppose each other via an air gap. The air gap is identical to the air gap W1 of the first embodiment, and is set in advance at a desired width.

As shown in FIG. 7, the first magnetic rotor 41a is constituted by S magnetic poles 11a and N magnetic poles 12a. The magnetic poles 11a, 12a have a uniform length λ1. Further, the magnetic poles 11a, 12a are arranged alternately. Similarly, as shown in FIG. 7, the second magnetic rotor 41b is constituted by S magnetic poles 11b and N magnetic poles 12b. The magnetic poles 11b, 12b have a uniform length λ2. Further, the magnetic poles 11b, 12b are arranged alternately.

In the third embodiment, the position detection length L is set to equal the circumference of the magnetic rotor 1A.

As shown in FIG. 7, the length λ1 of the magnetic poles 11a, 12a of the first magnetic rotor 41a is greater than the length λ2 of the magnetic poles 11b, 12b of the second magnetic rotor 41b, similarly to the first embodiment.

Therefore, the number of magnetic poles on the first magnetic rotor 41a and the number of magnetic poles on the second magnetic rotor 41b differ from each other over the position detection length L of the magnetic rotor 1A. Here, the number of magnetic poles on the first magnetic rotor 41a is a sum of the number of N magnetic poles 12a and the number of S magnetic poles 11a. Similarly, the number of magnetic poles on the second magnetic rotor 41b is a sum of the number of N magnetic poles 12b and the number of S magnetic poles 11b.

In the example shown in FIG. 7, the difference between the number of magnetic poles on the first magnetic rotor 41a and the number of magnetic poles on the second magnetic rotor 41b is two.

In the third embodiment, similarly to the first embodiment, the first magnetic rotor 41a and the second magnetic rotor 41b are formed such that the difference between the numbers of magnetic poles is two.

When the number of magnetic poles on the first magnetic rotor 41a is set at k, an angular width of one magnetic pole 11a, 12a can be expressed by 360/k. When the number of magnetic poles on the second magnetic rotor 41b is set at k+2, an angular width of one magnetic pole 11b, 12b of the second magnetic rotor 41b can be expressed by 360/(k+2).

Note that respective diameters of the first magnetic rotor 41a and the second magnetic rotor 41b do not have to be equal, and may be set at different values. Further, in FIG. 7, boundaries between the magnetic poles 11a, 12a of the first magnetic rotor 41a and the magnetic poles 11b, 12b of the second magnetic rotor 41b are set to be perpendicular to a circumferential direction (a rotation direction). In other words, the magnetic poles 11a, 12a, 11b, 12b in FIG. 7 are formed by bending the rectangular magnetic poles 11a, 12a, 11b, 12b of the first embodiment in alignment with an arc shape on the outer peripheries of the first magnetic rotor 41a and the second magnetic rotor 41b. The respective magnetic poles 11a, 12a, 11b, 12b are not limited to this shape, however, and may be formed in a different shape as long as they are arranged alternately and have a uniform length. For example, the magnetic poles 11a, 12a, 11b, 12b may be bent into a parallelogram shape such that the boundaries between the magnetic poles 11a, 12a of the first magnetic rotor 41a and the magnetic poles 11b, 12b of the second magnetic rotor 41b are constituted by straight lines rotated by a fixed angle relative to the circumferential direction (the rotation direction). Furthermore, in FIG. 7, the first magnetic rotor 41a has eight magnetic poles and the second magnetic rotor 41b has six, but the invention is not limited to this configuration, and the respective numbers of magnetic poles on the two magnetic rotors may be set as desired as long as the difference therebetween is maintained at two. In the following description, these numbers will be referred to respectively as k and k+2.

The magnetism sensing device 2 is constituted by the first magnetism sensing element group 2a and the second magnetism sensing element group 2b. The first magnetism sensing element group 2a is constituted by the n magnetism sensing elements 21a to 21d, and the second magnetism sensing element group 2b is constituted by the m magnetism sensing elements 21e to 21g. The magnetism sensing device 2 is disposed opposite the magnetic rotor 1A via a predetermined air gap. The magnetism sensing device 2 moves relative to the magnetic rotor 1A through a magnetic field formed by the magnetic rotor 1A in an arrangement direction of the magnetic rotor 1A while maintaining the air gap, and detects variation in the magnetic field during this relative movement using the magnetism sensing elements 21a to 21g. To describe the variation in the magnetic field, the magnetic strength and magnetic direction of the N magnetic poles and S magnetic poles vary in the magnetic field in periods of the magnetic pole pairs.

The respective air gaps between the magnetism sensing elements 21a to 21g and the magnetic rotor 1A do not have to be identical, and as long as the air gaps are maintained as the magnetism sensing elements 21a to 21g move relative to the magnetic rotor 1A, the air gaps may differ among the respective magnetism sensing elements 21a to 21g. Hall elements, anisotropic magneto-resistive (AMR) devices, giant magneto-resistive (GMR) devices, tunnel magneto-resistance (TMR) devices, or the like are used as the magnetism sensing elements 21a to 21g constituting the magnetism sensing device 2. FIG. 1 shows an example in which the first magnetism sensing element group 2a is constituted by four magnetism sensing elements and the second magnetism sensing element group 2b is constituted by three magnetism sensing elements. However, the respective numbers of arranged magnetism sensing elements are not limited thereto, and will be referred to in the following description as n and m.

The n magnetism sensing elements 21a to 21d of the first magnetism sensing element group 2a detect the magnetic field formed by the first magnetic rotor 41a. The m magnetism sensing elements 21e to 21g of the second magnetism sensing element group 2b detect the magnetic field formed by the second magnetic rotor 41b.

The number of magnetism sensing elements 21 in the first magnetism sensing element group 2a and the number of magnetism sensing elements 21 in the second magnetism sensing element group 2b are set at a ratio of the inverse of the number k of magnetic poles on the first magnetic rotor 41a to the inverse of the number k+2 of magnetic poles on the second magnetic rotor 41b. Hence, when the number of magnetism sensing elements in the first magnetism sensing element group 2a is set at n and the number of magnetism sensing elements in the second magnetism sensing element group 2b is set at m, n and m can be expressed respectively by Equations (27) and (28), shown below.

$$n = k/2 + 1 \quad (27)$$

$$m = k/2 \quad (28)$$

Note that one of the number n of magnetism sensing elements 21 in the first magnetism sensing element group 2a and the number m of magnetism sensing elements 21 in the second magnetism sensing element group 2b may be reduced. One of n and m, respectively calculated using Equations (27) and (28), is an even number and the other is an odd number. When the even number of magnetism sensing elements 21 is to be reduced, the number of magnetism sensing elements may be halved, and when the odd number of magnetism sensing elements 21 is to be reduced, the number of magnetism sensing elements may be halved after adding 1 thereto.

When the number n of magnetism sensing elements 21 in the first magnetism sensing element group 2a, calculated using Equation (27), is even and the number m of magnetism sensing elements 21 in the second magnetism sensing element group 2b, calculated using Equation (28), is odd, and the number n of magnetism sensing elements 21 in the first magnetism sensing element group 2a is reduced, n and m are expressed respectively by Equations (29) and (30), shown below.

$$n=k/4+1/2 \quad (29)$$

$$m=k/2 \quad (30)$$

When the number m of magnetism sensing elements 21 in the second magnetism sensing element group 2b is reduced, on the other hand, n and m are expressed respectively by Equations (31) and (32), shown below.

$$n=k/2+1 \quad (31)$$

$$m=k/4+1/2 \quad (32)$$

Further, when the number n of magnetism sensing elements 21 in the first magnetism sensing element group 2a, calculated using Equation (27), is odd and the number m of magnetism sensing elements 21 in the second magnetism sensing element group 2b, calculated using Equation (28), is even, and the number n of magnetism sensing elements 21 in the first magnetism sensing element group 2a is reduced, n and m are expressed respectively by Equations (33) and (34), shown below.

$$n=k/4+1 \quad (33)$$

$$m=k/2 \quad (34)$$

When the number m of magnetism sensing elements in the second magnetism sensing element group 2b is reduced, on the other hand, n and m are expressed respectively by Equations (35) and (36), shown below.

$$n=k/2+1 \quad (35)$$

$$m=k/4 \quad (36)$$

When the number of magnetism sensing elements 21 in the first magnetism sensing element group 2a is calculated at n using Equation (27) and the number of magnetism sensing elements 21 in the second magnetism sensing element group 2b is calculated at m using Equation (28), the magnetism sensing elements 21 of the first magnetism sensing element group 2a are disposed uniformly within the range of the angular width of one magnetic pole 11a, 12a of the first magnetic rotor 41a, and the magnetism sensing elements 21 of the second magnetism sensing element group 2b are disposed uniformly within the range of the angular width of one magnetic pole 11b, 12b of the second magnetic rotor 41b. When the arrangement interval between the magnetism sensing elements 21 of the first magnetism sensing element group 2a is set at P1 and the arrangement interval between the magnetism sensing elements 21 of the second magnetism sensing element group 2b is set at P2, P1 and P2 are expressed respectively by Equations (37) and (38), shown below.

$$P1=360/n/k \quad (37)$$

$$P2=360/m/(k+2) \quad (38)$$

Note that when the value of n is calculated using Equation (29) and the value of m is calculated using Equation (30), or when the value of n is calculated using Equation (35) and the value of m is calculated using Equation (36), P1 calculated in Equation (37) and P2 calculated in Equation (38) may be employed as the arrangement intervals of the magnetism sensing elements 21. When the value of n is calculated using Equation (31) and the value of m is calculated using Equation (32), on the other hand, the arrangement interval P1 between the magnetism sensing elements 21 of the first magnetism sensing element group 2a and the arrangement interval P2 between the magnetism sensing elements 21 of the second magnetism sensing element group 2b are expressed respectively by Equations (39) and (40), shown below.

$$P1=360/n/k \quad (39)$$

$$P2=360/(m-1/2)/(k+2) \quad (40)$$

However, the arrangement interval P2 between the magnetism sensing elements 21 of the second magnetism sensing element group 2b does not have to be constituted only by P2 calculated using Equation (40). More specifically, the arrangement interval of only one of the magnetism sensing elements may be set at P2', as shown below in Equation (41), while the other arrangement intervals of the magnetism sensing device are set at P2 calculated using Equation (40).

$$P2'=360/(2\times m-1)/(k+2) \quad (41)$$

Further, when the value of n is calculated using Equation (33) and the value of m is calculated using Equation (34), the arrangement interval P1 between the magnetism sensing elements 21 of the first magnetism sensing element group 2a and the arrangement interval P2 between the magnetism sensing elements 21 of the second magnetism sensing element group 2b are expressed respectively by Equations (42) and (43), shown below.

$$P1=360/(n-1/2)/k \quad (42)$$

$$P2=360/m/(k+2) \quad (43)$$

However, the arrangement interval P1 between the magnetism sensing elements 21 of the first magnetism sensing element group 2a does not have to be constituted only by P1 calculated using Equation (42). More specifically, the arrangement interval of one of the magnetism sensing elements may be set at P1', as shown below in Equation (44), while the other arrangement intervals of the magnetism sensing device are set at P1 calculated using Equation (42).

$$P1'=360/(2\times n-1)/k \quad (44)$$

The position detection and calculation method is basically identical to the position detection and calculation method of the first embodiment, described above, except that in the third embodiment, the detected position is a rotation angle. Accordingly, information indicating the position of the magnetism sensing device 2 on the magnetic rotor 1A, which is stored in advance in the position conversion table unit 34, is constituted by rotation angle information. Since the detected position information is constituted by rotation angles, the position detection resolution is set such that when the resolution of the absolute position of the first magnetism sensing element group 2a on the first magnetic rotor 41a is set at δ1 and the resolution of the absolute position of the second magnetism sensing element group 2b on the second magnetic rotor 41b is set at δ2, δ1 and δ2 are expressed respectively by Equations (45) and (46), shown below.

$$\delta 1=360/n/k \quad (45)$$

$$\delta 2=360/m/(k+2) \quad (46)$$

The value of n used to calculate the resolution δ1 and the value of m used to calculate the resolution δ2 are determined from the value of n calculated using Equation (27) and the value of m calculated using Equation (28), respectively, and not from the values of Equations (29) to (36), in which the values of n and m are reduced.

Further, in FIG. 7, the position detection length L is set to equal the circumference of the magnetic rotor 1A, but this invention is not limited thereto, and a part of the circumference of the magnetic rotor 1A may be set as L. When a ratio of the part L to the circumference of the magnetic rotor 1A is set at r (=L/R, where R denotes the circumference), the number of magnetism sensing elements 21 in the first magnetism sensing element group 2a is set at n=(k+2)/2×r, and the number of magnetism sensing elements 21 in the second magnetism sensing element group 2b is set at m=k/2×r. Furthermore, Equations (37) to (46), which are used to calculate the arrangement interval P1 between the magnetism sensing elements 21 of the first magnetism sensing element group 2a, the arrangement interval P2 between the magnetism sensing elements 21 of the second magnetism sensing element group 2b, the position detection resolution δ1 of the positions in which the first magnetic rotor 41a and the first magnetism sensing element group 2a are detected, and the position detection resolution δ2 of the positions in which the second magnetic rotor 41b and the second magnetism sensing element group 2b are detected, respectively, may be expressed respectively by Equations (47) to (56), shown below.

$$P1 = 360/n/k \times r \quad (47)$$

$$P2 = 360/m/(k+2) \times r \quad (48)$$

$$P1 = 360/n/k \times r \quad (49)$$

$$P2 = 360/(m-1/2)/(k+2) \times r \quad (50)$$

$$P2' = 360/(2 \times m-1)/(k+2) \times r \quad (51)$$

$$P1 = 360/(n-1/2)/k \times r \quad (52)$$

$$P2 = 360/m/(k+2) \times r \quad (53)$$

$$P1' = 360/(2 \times n-1)/k \times r \quad (54)$$

$$\delta1 = 360/n/k \times r \quad (55)$$

$$\delta2 = 360/m/(k+2) \times r \quad (56)$$

According to the third embodiment, as described above, the two magnetic rotors 41a, 41b on which the magnetic pole pairs are arranged, each magnetic pole pair being constituted by an N pole and an S pole and the difference between the respective numbers of magnetic poles on the two magnetic rotors 41a, 41b being two, and the magnetism sensing device 2, on which the plurality of magnetism sensing elements 21 are arranged in alignment with the length of one magnetic pole of the magnetic rotor 1A, are disposed opposite each other via a predetermined air gap, and by having the magnetism sensing device 2 detect magnetic field variation, the rotation angle of the magnetism sensing device 2 relative to the magnetic rotor 1A can be calculated.

As a result, it is possible to obtain a magnetic position detection device and a magnetic position detection method having a simple configuration and exhibiting a high speed response, with which an absolute angle of the magnetism sensing device 2 relative to the magnetic rotor 1A can be calculated at a position detection resolution δ=360/n/k=360/m/(k+2) using the two magnetic rotors 41a, 41b respectively having the numbers of magnetic poles k and k+2 when the two numbers of magnetism sensing elements are set respectively at n and m.

Fourth Embodiment

In a magnetic position detection device according to a fourth embodiment, the position calculation device 3 uses a different position calculation method to that of the first to third embodiments, described above. With the magnetic position detection device according to the fourth embodiment, similar effects to those of the magnetic position detection device according to the first embodiment can be obtained. In the fourth embodiment, the position calculation device 3 is configured differently to the first embodiment, but all other configurations are identical to the first embodiment, and therefore detailed description thereof with reference to FIGS. 1, 3, and 4 has been omitted.

FIG. 8 is a view showing an example configuration of the position calculation device 3 of the magnetic position detection device according to the fourth embodiment of this invention. The position calculation device 3 shown in FIG. 8 differs from the position calculation device 3 of the first embodiment, shown in FIG. 2, in that a position counter unit 36 has been added thereto.

In the fourth embodiment, when position detection is performed for the first time after a power supply of the magnetic position detection device is switched ON, the position calculation unit 33 of the position calculation device 3 detects the position on the magnetic scale 1 using the same position detection method as that of the first embodiment. The information indicating the absolute position on the magnetic scale 1, detected by the position calculation unit 33, is input into the position counter unit 36. The position counter unit 36 converts the absolute position information into a pre-allocated value using table data stored in advance.

In the fourth embodiment, when position detection is performed for the second time and beyond, the position calculation unit 33 detects the absolute position on the magnetic scale 1 on the basis of the signals from one of the magnetism sensing element groups (here, the second magnetism sensing element group 2b) and a signal from the position counter unit 36.

As described in the first embodiment, the Hi/Lo outputs 32e to 32g output by the Hi/Lo determination unit 32 form signal patterns of a single period with respect to each magnetic pole pair, and therefore the position counter unit 36 has a function for incrementing or decrementing the information indicating the absolute position on the magnetic scale 1 in relation to each magnetic pole pair.

The position counter unit 36 will now be described in detail.

A data table shown in FIG. 9 is created in advance and stored in the position counter unit 36.

FIG. 9 shows an example of the data table stored in the position counter unit 36. On the data table shown in FIG. 9, the Hi/Lo outputs 32e to 32g output by the Hi/Lo determination unit 32 as the magnetism sensing device 2 moves relative to the magnetic scale 1 and the output of the position counter unit 36 are stored in association with each other for each position on the magnetic scale 1.

Information indicating absolute positions (1 to 24) on the magnetic scale 1, which is calculated by the position calculation unit 33 as the magnetism sensing device 2 moves relative to the magnetic scale 1, is shown on row 1 of FIG. 9.

A signal α output by the position counter unit 36 in relation to the information indicating each absolute position (1 to 24) on the magnetic scale 1 is shown on row 2 of FIG. 9.

Information indicating one of Hi/Lo signal patterns "1" to "6" of the Hi/Lo outputs 32*e* to 32*g* from the Hi/Lo determination unit 32 is shown on row 3 of FIG. 9 in relation to the information indicating each absolute position (1 to 24) on the magnetic scale 1. The signal patterns "1" to "6" indicate the positions of the magnetism sensing elements 21*a* and 21*e*.

The (Hi/Lo) signal patterns of the Hi/Lo outputs 32*e* to 32*g* from the Hi/Lo determination unit 32 are shown on rows 4 to 6 of FIG. 9 in relation to the information indicating each absolute position (1 to 24) on the magnetic scale 1.

Here, as noted above, the magnetic field formed by the magnetic scale 1 is such that the magnetic strength and magnetic direction of the N magnetic poles and S magnetic poles vary in periods of the magnetic pole pairs. In the second magnetic scale 1*b*, the position detection length L includes four periods. More specifically, position "1" to position "6" on the magnetic scale 1 corresponds to one period, position "7" to position "12" on the magnetic scale corresponds to one period, position "13" to position "18" on the magnetic scale corresponds to one period, and position "19" to position "24" on the magnetic scale corresponds to one period. One of these periods "0", "1", "2", and "3" is allocated to each position "1" to "24" on the magnetic scale and stored on row 2 of FIG. 9 as the output signal α of the position counter unit 36.

Further, as shown in FIG. 9, the respective periods "0", "1", "2", and "3" include the Hi/Lo signal patterns "1" to "6" of the Hi/Lo outputs 32*e* to 32*g*. In the signal pattern "1", 32*e*, 32*f*, and 32*g* are all Hi, in the signal pattern "2", 32*e* and 32*f* are Hi while 32*g* is Lo, in the signal pattern "3", 32*e* is Hi while 32*f* and 32*g* are Lo, in the signal pattern "4", 32*e*, 32*f*, and 32*g* are all Lo, in the signal pattern "5", 32*e* and 32*f* are Lo while 32*g* is Hi, and in the signal pattern "6", 32*e* is Lo while 32*f* and 32*g* are Hi. The signal patterns "1" to "6" are stored on row 3 of FIG. 9.

In the fourth embodiment, when position detection is performed for the first time, the information indicating the absolute position on the magnetic scale 1, detected by the position calculation unit 33, is input into the position counter unit 36. When position detection is performed for the second time and beyond, the position counter unit 36 converts the information indicating the absolute position into the period "0", "1", "2", or "3" allocated thereto on row 2 of FIG. 9, and outputs the allocated period as the signal α.

Note that when position detection is performed for the second time and beyond, the Hi/Lo outputs 32*e* to 32*g* from the Hi/Lo determination unit 32 are input into the position counter unit 36. The position counter unit 36 retrieves the signal pattern, among the signal patterns "1" to "6", to which the input Hi/Lo outputs 32*e* to 32*g* correspond from row 3 of FIG. 9 by referring to the data table shown in FIG. 9, and outputs the retrieved signal pattern as a signal β. Further, when the retrieved signal pattern changes from "6" to "1", the position counter unit 36 increments the value of the signal α, and when the signal pattern changes from "1" to "6", the position counter unit 36 decrements the value of the signal α.

Hence, the magnetic position detection device according to the fourth embodiment performs position detection using an identical method to the position detection method of the first embodiment when position detection is performed for the first time after switching the power supply ON, and performs position detection on the basis of the signals α and β from the position counter unit 36 when position detection is performed for the second time and beyond.

Next, using FIGS. 8 and 9, an operation of the magnetic position detection device according to the fourth embodiment will be described. When position detection is performed for the first time after switching the power supply ON or the like, the pulse generation unit 31 outputs the pulse outputs 31*a* to 31*g* in accordance with the output signals output by the magnetism sensing elements 21*a* to 21*d* of the first magnetism sensing element group 2*a* that detects the magnetic field of the first magnetic scale 1*a* and the output signals output by the magnetism sensing elements 21*e* to 21*g* of the second magnetism sensing element group 2*b* that detects the magnetic field of the second magnetic scale 1*b*, as described above in the first embodiment. Next, the Hi/Lo determination unit 32 determines whether the pulse outputs 31*a* to 31*g* are Hi or Lo, and outputs the determination results as the Hi/Lo outputs 32*a* to 32*g*. The position calculation unit 33 then calculates the absolute position on the magnetic scale 1 using the Hi/Lo outputs 32*a* to 32*g* and the table data shown in FIG. 4(*b*), which is stored in advance in the position conversion table unit 34. This operation is identical to the operation described in the first embodiment.

Information indicating the absolute position calculated for the first time in this manner is transmitted to the position counter unit 36 immediately after being calculated. The position counter unit 36 converts the transmitted absolute position information into the corresponding value "0", "1", "2", or "3" by referring to the data table shown in FIG. 9, which is stored therein in advance, and outputs the result to the position calculation unit 33. Thereafter, the position counter unit 36 increments or decrements the value of α with respect to each magnetic pole pair of the magnetic scale 1 whenever the Hi/Lo signal patterns of the signals 32*e* to 32*g* from the Hi/Lo determination unit 32 change, and outputs the resulting value to the position calculation unit 33.

When position detection is performed for the second time and beyond, the position calculation unit 33 calculates the absolute position on the magnetic scale 1 using the signals α and β from the position counter unit 36.

Information indicating the absolute position calculated in this manner is output from the output unit 35.

A calculation method employed by the position calculation unit 33 will now be described. When the magnetic scale position calculated by the position calculation unit 33 is set as X, the calculation performed by the position calculation unit 33 is as shown below in Equation (57).

$$X = 6 \times \alpha + \beta \quad (57)$$

When, after the power supply of the magnetic position detection device is switched ON, the position of the magnetism sensing device 2 on the magnetic scale 1 is determined to be the magnetic scale position "1", the position counter unit 36 calculates "0" as the value of α corresponding to "1" by referring to the data table in FIG. 9. When the position of the magnetism sensing device 2 on the magnetic scale 1 then moves by an amount corresponding to one magnetic pole pair, the output signal α of the position counter unit 36 is incremented to "1", whereby the Hi/Lo outputs 32*e* to 32*g* of the Hi/Lo determination unit 32 all become Hi and the positions β of the magnetism sensing elements 21*e* to 21*g* shift to "1". Accordingly, the magnetic scale position X calculated by the position calculation unit 33 in Equation (57) becomes "7".

According to the fourth embodiment, as described above, the absolute position of the magnetism sensing device on the magnetic scale can be calculated. Further, once the position information has been output after the power supply is switched ON, the absolute position can be calculated using only the magnetism sensing elements 21e to 21g of the magnetism sensing device 2, and since the magnetism sensing elements 21a to 21d of the magnetism sensing device 2, the pulse outputs 31a to 31d of the pulse generation unit 31, and the Hi/Lo outputs 32a to 32d of the Hi/Lo determination unit 32 are inoperative at this time, power supplies thereof can be stopped.

As a result, it is possible to obtain a magnetic position detection device and a magnetic position detection method with which the absolute position of the magnetism sensing device on the magnetic scale can be detected by means of a simple configuration at a position detection resolution $\delta=P/2$ that corresponds to the number of used magnetism sensing elements.

Note that an example in which the fourth embodiment is applied to the first embodiment was described above, but the invention is not limited to this case, and the fourth embodiment may of course be applied likewise to the second and third embodiments.

Fifth Embodiment

In a fifth embodiment, a case in which the magnetism sensing device 2 is formed on a single semiconductor chip 22 in order to improve the position detection resolution of the magnetism sensing device 2 will be described.

Figure 10:
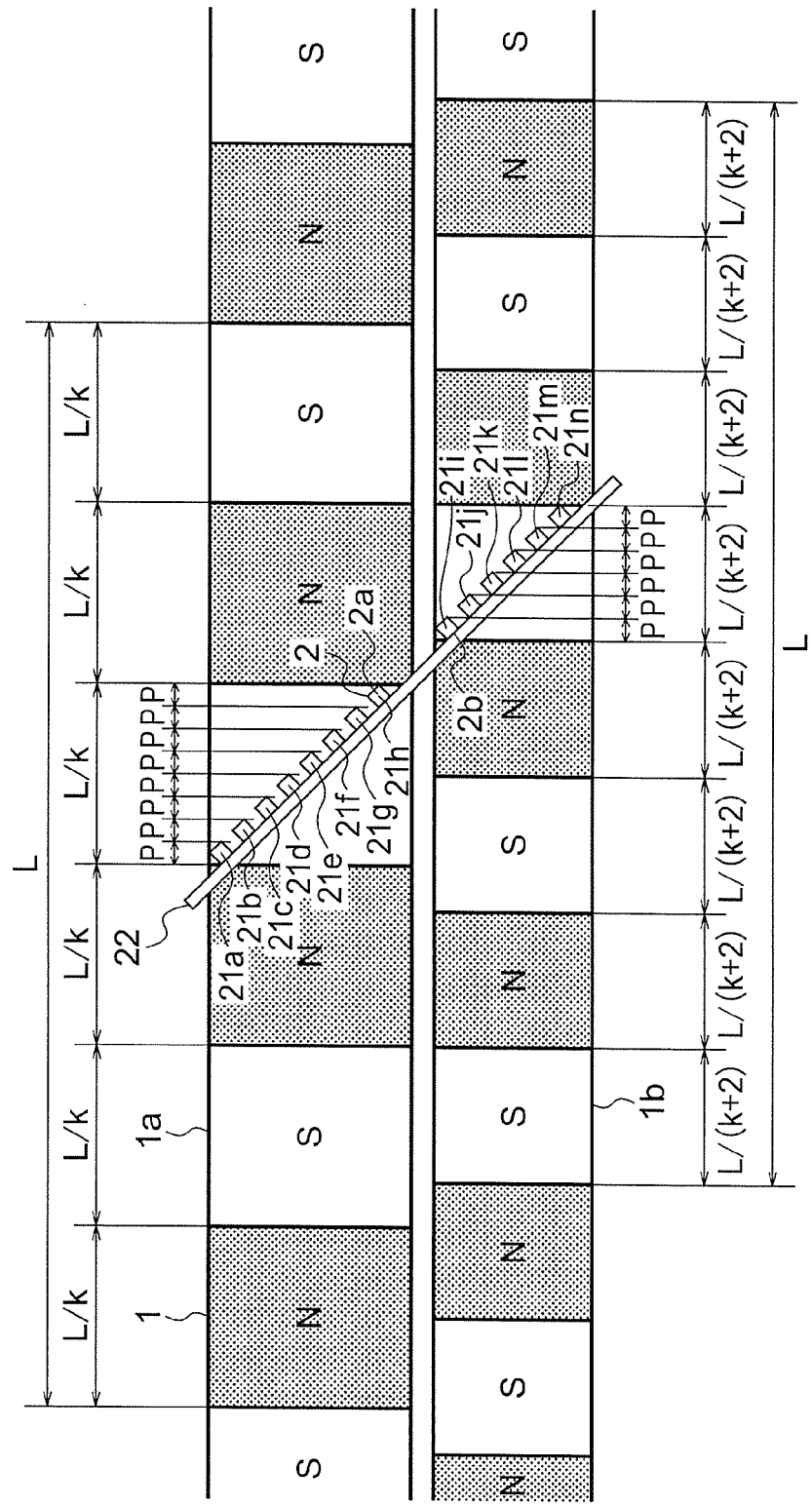
FIG. 10 is a view showing an arrangement of a magnetic scale and magnetism sensing elements bundled in a semiconductor chip according to a fifth embodiment of this invention.

FIG. 10 is a view showing an example configuration of the magnetism sensing device 2 according to a fifth embodiment of this invention. As shown in FIG. 10, the magnetism sensing device 2 according to the fifth embodiment is formed on the single semiconductor chip 22 by means of a semiconductor process. All other configurations are identical to the first and second embodiments, and therefore description thereof has been omitted.

In the second embodiment described above, position detection is performed using the magnetism sensing elements 21a to 21h of the first magnetism sensing element group used to detect the magnetic field formed by the magnetic scale 1a and the magnetism sensing elements 21i to 21n of the second magnetism sensing element group used to detect the magnetic field formed by the magnetic scale 1b. To improve the position detection resolution, it is desirable to increase the number of magnetism sensing elements 21 and reduce the arrangement interval between the magnetism sensing elements 21. To obtain a highly precise magnetic position detection device at this time, the magnetism sensing elements 21 of the magnetism sensing device 2 must be disposed at equal intervals.

Hence, in the fifth embodiment, as shown in FIG. 10, the arrangement intervals between the magnetism sensing elements 21a to 21h of the first magnetism sensing element group and the magnetism sensing elements 21i to 21n of the second magnetism sensing element group are reduced while ensuring that the magnetism sensing elements are arranged at equal intervals by forming the magnetism sensing device 2 entirely on the semiconductor chip 22 by means of a semiconductor process. At this time, the first magnetism sensing element group 2a used to detect the magnetic field formed by the magnetic scale 1a and the second magnetism sensing element group 2b used to detect the magnetic field formed by the magnetic scale 1b are preferably disposed on an identical plane.

In so doing, the position detection resolution of the magnetism sensing device 2 can be improved. Further, irregularities such as slanting between the elements can be suppressed such that a uniform magnetism sensing characteristic is obtained, and as a result, the phase differences between the outputs can be made even, enabling an improvement in the precision with which the absolute position is detected.

According to the fifth embodiment, as described above, the precision with which the absolute position is detected can be improved by forming the magnetism sensing device on a single semiconductor chip, and as a result, the position detection resolution can be improved.

REFERENCE SIGNS LIST

1 Magnetic scale
1A Magnetic rotor
1a, 41a First magnetic scale
1b, 41b Second magnetic scale
2 Magnetism sensing device
2a First magnetism sensing element group
2b Second magnetism sensing element group
3 Position calculation device
11a, 11b, 12a, 12b Magnetic pole
21a, 21b, 21c, 21d, 21e, 21f, 21g, 21h, 21i, 21j, 21k, 21l, 21m, 21n Magnetism sensing element
31 Pulse generation unit
31a, 31b, 31c, 31d, 31e, 31f, 31g Pulse output
32 Hi/Lo determination unit
32a, 32b, 32c, 32d, 32e, 32f, 32g Hi/Lo output
33 Position calculation unit
34 Position conversion table unit
35 Output unit
36 Position counter unit

The invention claimed is:

1. A magnetic position detection device comprising:
a magnetic scale constituted by a first magnetic scale on which N magnetic poles and S magnetic poles of a uniform length λ1 are arranged alternately in a movement direction, and a second magnetic scale which is provided parallel to the first magnetic scale, and on which N magnetic poles and S magnetic poles of a uniform length λ2 are arranged alternately in the movement direction;
a magnetism sensing device that is disposed opposite the first magnetic scale and the second magnetic scale via respective air gaps, and that moves in the movement direction relative to the first magnetic scale and the second magnetic scale through magnetic fields formed respectively by the first magnetic scale and the second magnetic scale while maintaining the air gaps, and measures using magnetism sensing elements variation in the magnetic fields during the relative movement; and
a position calculation device in which signal patterns of the magnetism sensing elements and information indicating absolute positions of the magnetism sensing elements relative to the magnetic scale are stored in association with each other in advance, and which calculates the absolute positions of the magnetism sensing elements relative to the magnetic scale based on output values of the magnetism sensing elements, output by the magnetism sensing device,
wherein a total number of magnetic poles obtained by adding together respective numbers of the N magnetic poles and the S magnetic poles included on the first magnetic scale is k, and a total number of magnetic poles obtained by adding together respective numbers of the N magnetic poles and the S magnetic poles included on the second magnetic scale is k+2, a difference between the respective numbers of magnetic poles being 2, the magnetism sensing device comprises:
  a first magnetism sensing element group constituted by one or more magnetism sensing elements for detecting variation in the magnetic field formed by the first magnetic scale; and
  a second magnetism sensing element group constituted by one or more magnetism sensing elements for detecting variation in the magnetic field formed by the second magnetic scale, the magnetism sensing device outputs measurement results indicating variation in the magnetic fields during the relative movement in parallel by the respective magnetism sensing elements constituting the first magnetism sensing element group and the second magnetism sensing element group, a ratio of a number n of magnetism sensing elements in the first magnetism sensing element group to a number m of magnetism sensing elements in the second magnetism sensing element group is equal to a ratio of an inverse of the number k of magnetic poles on the first magnetic scale to an inverse of the number k+2 of magnetic poles on the second magnetic scale, and the magnetism sensing elements are arranged by setting an arrangement interval between the magnetism sensing elements of the first magnetism sensing element group at P1 so that output waveforms of signals output respectively by the magnetism sensing elements of the first magnetism sensing element group deviate from each other successively by a phase P1=λ1/n obtained by dividing the length λ1 of one magnetic pole of the first magnetic scale equally by the number n of magnetism sensing elements, and setting an arrangement interval between the magnetism sensing elements of the second magnetism sensing element group at P2 so that output waveforms of signals output respectively by the magnetism sensing elements of the second magnetism sensing element group deviate from each other successively by a phase P2=λ2/m obtained by dividing the length λ2 of one magnetic pole of the second magnetic scale equally by the number m of magnetism sensing elements, or, in a case where one of the number n of magnetism sensing elements in the first magnetism sensing element group and the number m of magnetism sensing elements in the second magnetism sensing element group is an even number and the other is an odd number, the magnetism sensing elements are arranged by halving the even number of magnetism sensing elements.

2. The magnetic position detection device according to claim 1, wherein either the number n of magnetism sensing elements in the first magnetism sensing element group is multiplied by a value i so as to be set at a number $n_{multi}$, or the number m of magnetism sensing elements in the second magnetism sensing element group is multiplied by a value j so as to be set at a number $m_{multi}$, or the number n of magnetism sensing elements in the first magnetism sensing element group and the number m of magnetism sensing elements in the second magnetism sensing element group are multiplied respectively by the value i and the value j so as to be set at the number $n_{multi}$ and the number $m_{multi}$, the value i and the value j being natural numbers, when the number n of magnetism sensing elements in the first magnetism sensing element group is set at the number $n_{multi}$, an arrangement interval $P1_{multi}$ between the magnetism sensing elements in the first magnetism sensing element group is set at a uniform interval and at a value that is in inverse proportion to the arrangement interval P1 prior to multiplication by the value i, when the number m of magnetism sensing elements in the second magnetism sensing element group is set at the number $m_{multi}$, an arrangement interval $P2_{multi}$ between the magnetism sensing elements in the second magnetism sensing element group is set at a uniform interval and at a value that is in inverse proportion to the arrangement interval P2 prior to multiplication by the value j, and when the number n of magnetism sensing elements in the first magnetism sensing element group and the number m of magnetism sensing elements in the second magnetism sensing element group are set respectively at the number $n_{multi}$ and the number $m_{multi}$, the arrangement interval $P1_{multi}$ between the magnetism sensing elements in the first magnetism sensing element group is set at a uniform interval and at a value that is in inverse proportion to the arrangement interval P1 prior to multiplication by the value i, and the arrangement interval $P2_{multi}$ between the magnetism sensing elements in the second magnetism sensing element group is set at a uniform interval and at a value that is in inverse proportion to the arrangement interval P2 prior to multiplication by the value j.

3. The magnetic position detection device according to claim 1, wherein a position detection length over which the positions of the magnetism sensing elements in the first magnetism sensing element group relative to the first magnetic scale are detected is set at L1, a position detection length over which the positions of the magnetism sensing elements in the second magnetism sensing element group relative to the second magnetic scale are detected is set at L2, one of the value i and the value j is a divisor of the other, and when a position detection resolution at which the positions of the magnetism sensing elements in the first magnetism sensing element group relative to the first magnetic scale are detected is set at $\delta1_{multi}$ and a position detection resolution at which the positions of the magnetism sensing elements in the second magnetism sensing element group relative to the second magnetic scale are detected is set at $\delta2_{multi}$, the number $n_{multi}$, the number $m_{multi}$, the arrangement interval $P1_{multi}$, the arrangement interval $P2_{multi}$, the position detection resolution $\delta1_{multi}$, and the position detection resolution $\delta2_{multi}$ respectively satisfy $$n_{multi}=(k+2)/2 \times i,$$

$$m_{multi}=k/2 \times j,$$

$$P1_{multi}=L1/n/k/i,$$

$$P2_{multi}=L2/m/(k+2)/j,$$

$$\delta1_{multi}=L1/n/k/i, \text{ and}$$

$$\delta2_{multi}=L2/m/(k+2)/j.$$

4. The magnetic position detection device according to claim 3, wherein, when either the value i or the value j is set at 1, either the even number of magnetism sensing elements, among the number n of magnetism sensing elements in the first magnetism sensing element group and the number m of magnetism sensing elements in the second magnetism sensor element group, is halved and the arrangement interval between the magnetism sensing elements is doubled, or the odd number of magnetism sensing elements is halved after adding 1 thereto and either the arrangement interval between the magnetism sensing element is doubled or the arrangement interval in one location of the magnetism sensing elements is left unmodified while the arrangement interval in the remaining locations is doubled.

5. The magnetic position detection device according to claim 1, wherein the magnetic scale has an annular shape,
the movement direction is a circumferential direction, and
the position calculation device detects rotation angles of the magnetism sensing element relative to the magnetic scale as the absolute positions of the magnetism sensing elements relative to the magnetic scale.

6. The magnetic position detection device according to claim 5, wherein, when position detection is performed on a part of the annular shape, a ratio of a position detection range to a circumference being set at r, and a position detection resolution at which the positions of the magnetism sensing elements in the first magnetism sensing element group relative to the first magnetic scale are detected is set at δ1 and a position detection resolution at which the positions of the magnetism sensing elements in the second magnetism sensing element group relative to the second magnetic scale are detected is set at δ2, the number n, the number m, the arrangement interval P1, the arrangement interval P2, the position detection resolution δ1, and the position detection resolution δ2 respectively satisfy $n=(k+2)/2 \times r$, $m=k/2 \times r$, $P1=360/n/k \times r$, $P2=360/m/(k+2) \times r$, $δ1=360/n/k \times r$, and $δ2=360/m/(k+2) \times r$.

7. The magnetic position detection device according to claim 6, wherein, when either the value i or the value j is set at 1,
either the even number of magnetism sensing elements, among the number n of magnetism sensing elements in the first magnetism sensing element group and the number m of magnetism sensing elements in the second magnetism sensor element group, is halved and the arrangement interval between the magnetism sensing elements is doubled, or
the odd number of magnetism sensing elements is halved after adding 1 thereto and either the arrangement interval between the magnetism sensing element is doubled or the arrangement interval in one location of the magnetism sensing elements is left unmodified while the arrangement interval in the remaining locations is doubled.

8. The magnetic position detection device according to claim 1, wherein, during a first operation after a power supply is switched ON, the position calculation device calculates the absolute position based on output signals output by the magnetism sensing elements of the first magnetism sensing element group and the second magnetism sensing element group, and during a second operation and beyond following the first operation, the position calculation device calculates the absolute position based on a value obtained by incrementing or decrementing the absolute value obtained during the first operation, and the output signals output by the magnetism sensing elements of either the first magnetism sensing element group or the second magnetism sensing element group.

9. The magnetic position detection device according to claim 1, wherein the magnetism sensing elements are mounted on a single semiconductor chip.

10. A magnetic position detection method used by a magnetic position detection device, the magnetic position detection device including:

a magnetic scale constituted by a first magnetic scale on which N magnetic poles and S magnetic poles of a uniform length λ1 are arranged alternately in a movement direction, and a second magnetic scale which is provided parallel to the first magnetic scale, and on which N magnetic poles and S magnetic poles of a uniform length λ2 are arranged alternately in the movement direction;

a magnetism sensing device that is disposed opposite the first magnetic scale and the second magnetic scale via respective air gaps, and that moves in the movement direction relative to the first magnetic scale and the second magnetic scale through magnetic fields formed respectively by the first magnetic scale and the second magnetic scale while maintaining the air gaps, and measures using magnetism sensing elements variation in the magnetic fields during the relative movement; and a position calculation device that calculates absolute positions of the magnetism sensing elements relative to the magnetic scale by analyzing output values of the magnetism sensing elements, output by the magnetism sensing device, wherein a total number of magnetic poles obtained by adding together respective numbers of the N magnetic poles and the S magnetic poles included on the first magnetic scale is k, and a total number of magnetic poles obtained by adding together respective numbers of the N magnetic poles and the S magnetic poles included on the second magnetic scale is k+2, a difference between the respective numbers of magnetic poles being 2, the magnetism sensing device includes:
a first magnetism sensing element group constituted by one or more magnetism sensing elements for detecting variation in the magnetic field formed by the first magnetic scale; and
a second magnetism sensing element group constituted by one or more magnetism sensing elements for detecting variation in the magnetic field formed by the second magnetic scale, the magnetism sensing device outputs measurement results indicating variation in the magnetic fields during the relative movement in parallel by the respective magnetism sensing elements constituting the first magnetism sensing element group and the second magnetism sensing element group, a ratio of a number n of magnetism sensing elements in the first magnetism sensing element group to a number m of magnetism sensing elements in the second magnetism sensing element group is equal to a ratio of an inverse of the number k of magnetic poles on the first magnetic scale to an inverse of the number k+2 of magnetic poles on the second magnetic scale, and the magnetism sensing elements are arranged by setting an arrangement interval between the magnetism sensing elements of the first magnetism sensing element group at P1 so that output waveforms of signals output respectively by the magnetism sensing elements of the first magnetism sensing element group deviate from each other successively by a phase $P1=\lambda 1/n$ obtained by dividing the length $\lambda 1$ of one magnetic pole of the first magnetic scale equally by the number n of magnetism sensing elements, and setting an arrangement interval between the magnetism sensing elements of second magnetism sensing element group at P2 so that output waveforms of signals output respectively by the magnetism sensing elements of the second magnetism sensing element group deviate from each other successively by a phase $P2=\lambda 2/m$ obtained by dividing the length $\lambda 2$ of one magnetic pole of the second magnetic scale equally by the number m of magnetism sensing elements, or, in a case where one of the number n of magnetism sensing elements in the first magnetism sensing element group and the number m of magnetism sensing elements in the second magnetism sensing element group is an even number and the other is an odd number, the magnetism sensing elements are arranged by halving the even number of magnetism sensing elements, the magnetic position detection method comprising following steps executed by the position calculation device:

a Hi/Lo determination step for binarizing n+m output values output in parallel by the respective magnetism sensing elements of the magnetism sensing device by determining whether the output values are Hi or Lo, and outputting the binarized output values as n+m Hi/Lo outputs;

a storage step for storing in a storage unit a data table on which a relationship between the information indicating the absolute positions of the magnetism sensing elements relative to the magnetic scale and patterns of the n+m Hi/Lo outputs is defined in advance; and a position calculation step for calculating, on the basis of the data table stored in the storage unit in the storage step, the absolute positions of the magnetism sensing elements relative to the magnetic scale that correspond to the n+m Hi/Lo outputs output in the Hi/Lo determination step.

* * * * *